(12) United States Patent
Park et al.

(10) Patent No.: US 10,756,336 B2
(45) Date of Patent: Aug. 25, 2020

(54) THREE-DIMENSIONAL ELECTRODE STRUCTURE, AND SECONDARY BATTERY INCLUDING THE SAME, AND METHOD OF MANUFACTURING THE THREE-DIMENSIONAL STRUCTURE

(71) Applicant: Samsung Electronics Co., Ltd., Suwon-si, Gyeonggi-do (KR)

(72) Inventors: Hwiyeol Park, Hwaseong-si (KR); Huisu Jeong, Seongnam-si (KR); Kyounghwan Kim, Seoul (KR); Junhyeong Lee, Seoul (KR); Sungjin Lim, Suwon-si (KR); Jin S. Heo, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 156 days.

(21) Appl. No.: 15/872,562

(22) Filed: Jan. 16, 2018

(65) Prior Publication Data

US 2018/0375092 A1    Dec. 27, 2018

(30) Foreign Application Priority Data

Jun. 22, 2017  (KR) .................. 10-2017-0079214

(51) Int. Cl.
*H01M 4/36* (2006.01)
*H01M 10/052* (2010.01)
(Continued)

(52) U.S. Cl.
CPC .............. *H01M 4/36* (2013.01); *H01M 4/13* (2013.01); *H01M 4/131* (2013.01); *H01M 4/665* (2013.01);
(Continued)

(58) Field of Classification Search
CPC ............ H01M 4/70; H01M 2004/021; H01M 10/0472; H01M 4/72; H01M 8/0258
See application file for complete search history.

(56) References Cited

U.S. PATENT DOCUMENTS 7,385,801 B2   6/2008  Ando et al.
7,759,018 B2   7/2010  Cho et al.
(Continued)

FOREIGN PATENT DOCUMENTS

CN    104115325 A    10/2014
EP      3157090 A1    4/2017
(Continued)

OTHER PUBLICATIONS

Extended European Search Report issued by the European Patent Office dated Oct. 9, 2018, in the Examination of European Patent Application No. 18170743.1.
(Continued)

*Primary Examiner* — Imran Akram
(74) *Attorney, Agent, or Firm* — Cantor Colburn LLP

(57) ABSTRACT

A secondary battery including a first electrode structure; a second electrode structure spaced apart from the first electrode structure; and an electrolyte layer disposed between the first electrode structure and the second electrode structure, wherein the first electrode structure includes: a current collector layer; and plurality of first active material plates electrically connected to the current collector layer, protruding from the current collector layer, and including a first active material, wherein each plate of the plurality of first active material plates has a width and a length greater than the width, and the plurality of first active material plates are spaced apart from one another in a widthwise direction and in a lengthwise direction, and wherein the electrolyte layer (Continued)

extends into gaps between the plurality of first active material plates along the lengthwise direction.

23 Claims, 30 Drawing Sheets

(51) Int. Cl.
H01M 10/0562 (2010.01)
H01M 10/0565 (2010.01)
H01M 4/66 (2006.01)
H01M 10/0585 (2010.01)
H01M 10/04 (2006.01)
H01M 4/131 (2010.01)
H01M 4/13 (2010.01)
H01M 10/058 (2010.01)
H01M 4/02 (2006.01)

(52) U.S. Cl.
CPC ....... H01M 10/04 (2013.01); H01M 10/0436 (2013.01); H01M 10/0472 (2013.01); H01M 10/052 (2013.01); H01M 10/058 (2013.01); H01M 10/0562 (2013.01); H01M 10/0565 (2013.01); H01M 10/0585 (2013.01); H01M 2004/021 (2013.01); H01M 2004/028 (2013.01); H01M 2300/0065 (2013.01)

(56) References Cited

U.S. PATENT DOCUMENTS

| 8,440,355 | B2 | 5/2013 | Yang | |
|---|---|---|---|---|
| 9,356,271 | B2 | 5/2016 | Ramasubramanian et al. | |
| 9,590,232 | B2 | 3/2017 | Cobb et al. | |
| 2009/0142656 | A1 | 6/2009 | Nathan et al. | |
| 2011/0111283 | A1* | 5/2011 | Rust, III | H01M 4/0426 429/163 |
| 2011/0129732 | A1* | 6/2011 | Bachrach | H01M 4/139 429/220 |
| 2012/0176093 | A1* | 7/2012 | Ramasubramanian | H01M 10/48 320/134 |
| 2013/0189602 | A1* | 7/2013 | Lahiri | H01M 4/134 429/452 |
| 2014/0057169 | A1 | 2/2014 | George et al. | |
| 2014/0335395 | A1* | 11/2014 | Ramasubramanian | H01M 4/66 429/142 |
| 2016/0204464 | A1 | 7/2016 | Cho et al. | |
| 2017/0010423 | A1 | 1/2017 | Lu | |
| 2017/0084918 | A1* | 3/2017 | Yang | H01M 4/1391 |
| 2017/0104235 | A1* | 4/2017 | Cho | H01M 10/058 |
| 2018/0013119 | A1* | 1/2018 | Yang | H01M 2/204 |

FOREIGN PATENT DOCUMENTS

| JP | 5081214 | B2 | 9/2012 |
|---|---|---|---|
| JP | 5118301 | B2 | 10/2012 |
| JP | 6085409 | B2 | 2/2017 |
| KR | 1020140085323 | A | 7/2014 |
| KR | 1020160085624 | A | 7/2016 |
| KR | 1020160088126 | A | 7/2016 |
| KR | 1020170042935 | A | 4/2017 |

OTHER PUBLICATIONS

U.S. Appl. No. 15/489,790, filed Apr. 18, 2017.
U.S. Appl. No. 15/725,782, filed Oct. 5, 2017.

* cited by examiner

< COMPARATIVE EXAMPLE >

FIG. 6A
FIG. 6B
FIG. 6C
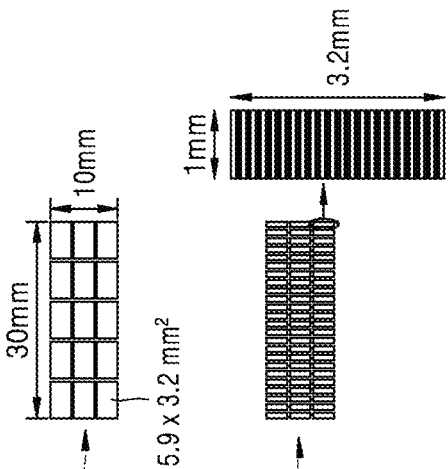
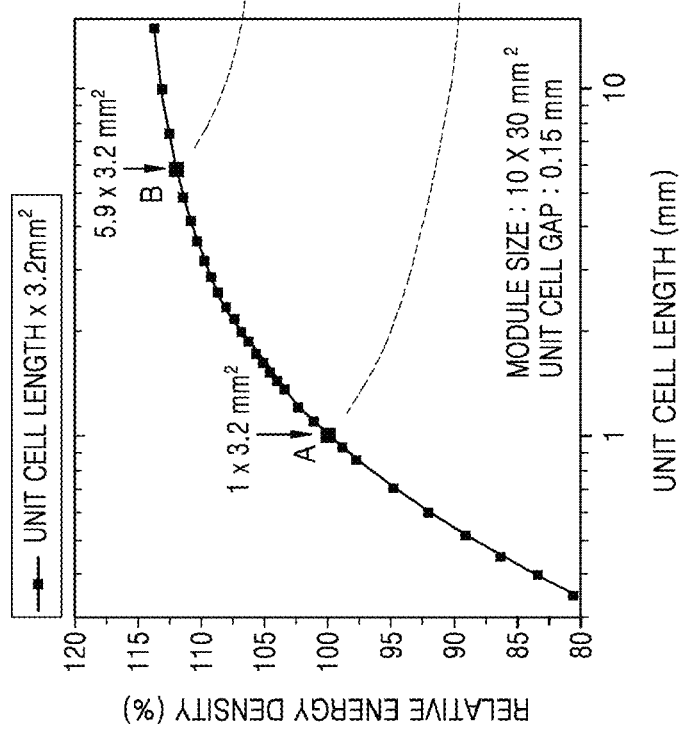

FIG. 8A   FIG. 8B
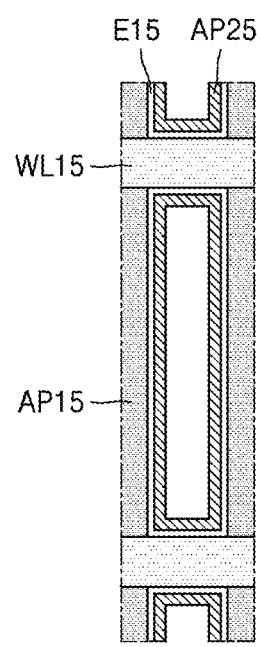
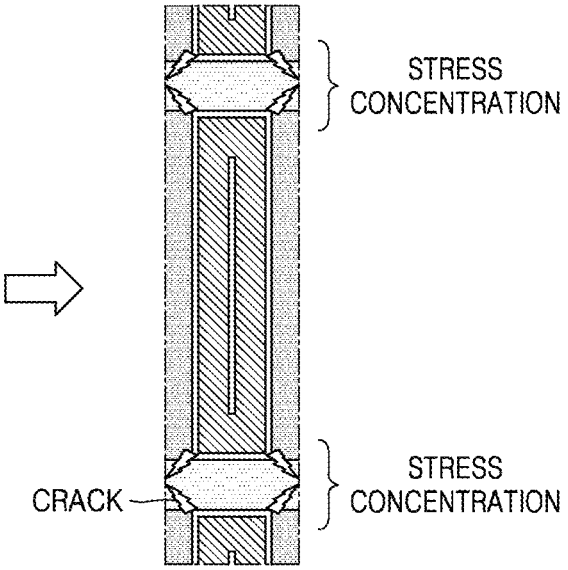
< COMPARATIVE EXAMPLE >

< BEFORE COATING >

< AFTER COATING >

< BEFORE COATING >

< AFTER COATING >

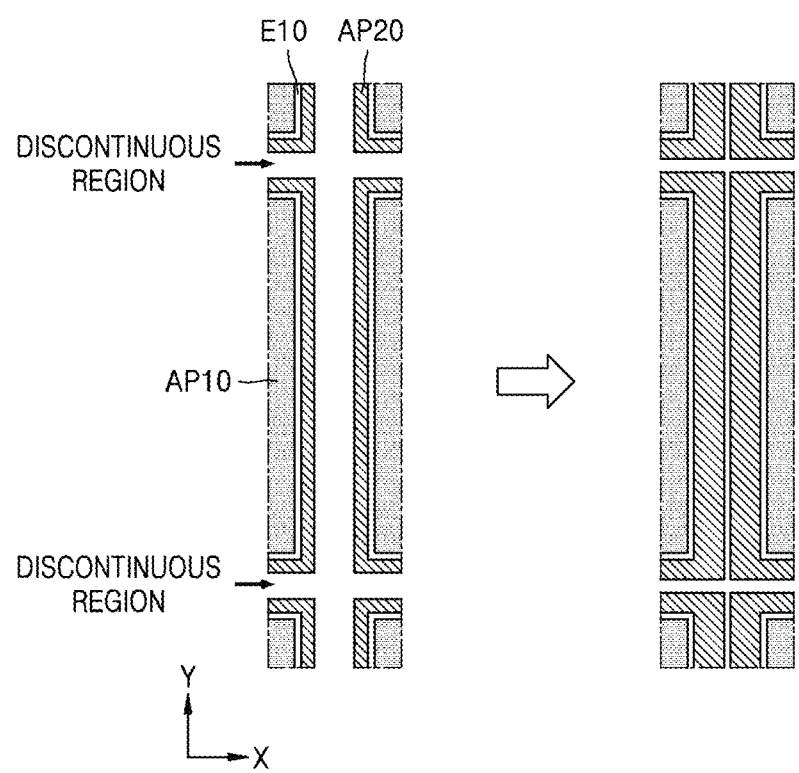

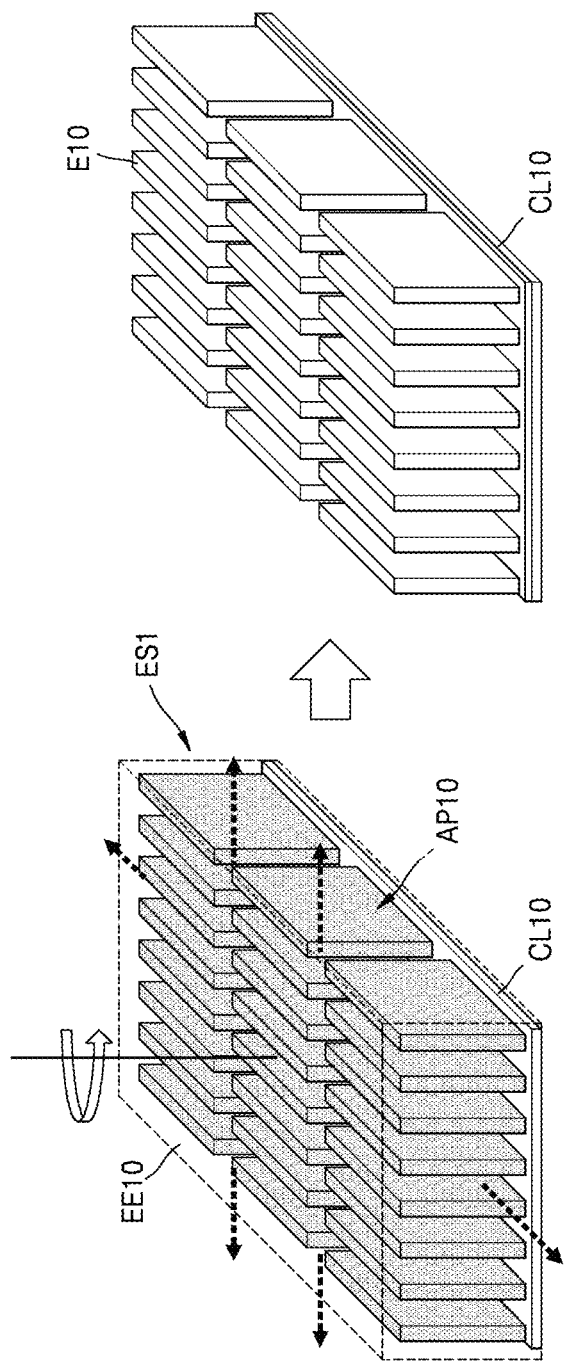

< Sintering >

< Cleaning >

< Sintering >

< Selective Etching >

< Cleaning >

THREE-DIMENSIONAL ELECTRODE STRUCTURE, AND SECONDARY BATTERY INCLUDING THE SAME, AND METHOD OF MANUFACTURING THE THREE-DIMENSIONAL STRUCTURE

CROSS-REFERENCE TO RELATED APPLICATION

This application claims priority to and the benefit of Korean Patent Application No. 10-2017-0079214, filed on Jun. 22, 2017, in the Korean Intellectual Property Office, and all of the benefits accruing therefrom under 35 U.S.C. § 119, the content of which in its entirety is incorporated herein by reference.

BACKGROUND

1. Field

The present disclosure relates to three-dimensional electrode structures, batteries including the three-dimensional electrode structures, and methods of manufacturing the three-dimensional electrode structures.

2. Description of the Related Art

A secondary battery is a battery capable of charging and discharging, unlike a primary battery that is unable to be recharged. Secondary batteries have been widely used in various electronic devices such as mobile phones, notebook computers, and camcorders. In particular, lithium secondary battery is desirable for an electronic device since it has a higher voltage and a higher energy density per unit weight than a nickel-cadmium battery or a nickel-hydrogen battery.

As the types of electronic devices using the secondary batteries diversifies, there is an increased demand for improvements in the performance of a secondary battery, for example, improvements such as increased energy density, rate capability, stability, durability, and flexibility. The energy density of a secondary battery is related to a capacity increase of the secondary battery, and the rate capability is related to an improvement in the charging speed of a secondary battery.

Accordingly, it would be desirable to provide secondary batteries having improved capacity and charging speed.

SUMMARY

Provided are electrode structures (three-dimensional electrode structures) which may improve the energy density of secondary batteries.

Provided are electrode structures which may be advantageous for increasing the capacity of a secondary battery and may improve the uniformity of reactions and structural stability therein.

Provided are electrode structures which may be advantageous for improving performance and extending the life of a secondary battery.

Provided are electrode structures which may improve a rate capability of a secondary battery.

Provided is a secondary battery including the above electrode structures.

Provided also are methods of manufacturing the electrode structures and the secondary battery.

According to an aspect of an embodiment, a secondary battery includes a first electrode structure, a second electrode structure spaced apart from the first electrode structure, and an electrolyte layer disposed between the first electrode structure and the second electrode structure, wherein the first electrode structure includes a current collector layer, and a plurality of first active material plates electrically connected to the current collector layer, protruding from the current collector layer, and including a first active material, wherein each of the plurality of first active material plates has a width and a length greater than the width, the plurality of first active material plates are disposed spaced apart from one another in a widthwise direction and in a lengthwise direction, and wherein the electrolyte layer extends into gaps between the plurality of first active material plates along the lengthwise direction.

The plurality of first active material plates may include a first plate and a second plate spaced apart from the first plate in the lengthwise direction, the first plate has a first end surface facing the second plate, and the second plate has a second end surface facing the first end surface, and the electrolyte layer covers at least a portion of each of the first end surface and the second end surface.

The plurality of first active material plates may include a third plate spaced apart from the first plate in the widthwise direction, the first plate has a first side surface facing the third plate, and the third plate has a second side surface facing the first side surface, and the electrolyte layer covers at least a portion of each of the first side surface and the second side surface.

The second electrode structure may include a second active material member including a second active material, and the second active material member extends between the plurality of first active material plates along the widthwise direction and between the plurality of first active material plates along the lengthwise direction.

An empty space may be present between the second active material member and the plurality of first active material plates.

The first electrode structure may be a cathode, and the second electrode structure may be an anode.

The width of each plate of the plurality of first active material plates may be about 5 micrometers ($\mu$m) or greater.

A ratio of a height to the width of each plate of the first plurality of active material plates may be about 4:1 or greater.

Each plate of the plurality of first active material plates has a length greater than a height thereof.

A gap between the plurality of first active material plates in the widthwise direction may correspond to 50% or more of the width of each plate.

A gap between the plurality of first active material plates in the lengthwise direction may correspond to 50% or greater of the width of each plate of the plurality of first active material plates.

A first plate and a second plate of the plurality of first active material plates may have lengths which are different from each other.

The plurality of first active material plates may include a first group of plates and a second group of plates spaced apart from the first group of plates in the lengthwise direction, wherein the second group of plates is closer to an end portion of the first electrode structure in the lengthwise direction than the first group of plates, and a length of each plate of the second group of plates may be shorter than a length of each plate of the first group of plates.

Each plate of the plurality of first active material plates may include an inner current collector (e.g., current collecting) layer, and the inner current collecting layer may be electrically connected to the current collecting layer.

The current collecting layer may include a conductor-active material composite.

A content of an active material in the conductor-active material composite may be about 30 volume percent (vol %) or less based on a total volume of the conductor-active material composite.

The second electrode structure may include a plurality of second active material plates, and the plurality of first active material plates and the plurality of second active material plates may be alternately arranged.

The first electrode structure, the electrolyte layer, and the second electrode structure constitute a cell, and the secondary battery may include a plurality of cells which are stacked.

The secondary battery may be a lithium secondary battery.

According to an aspect of another embodiment, a secondary battery includes a first electrode structure, a second electrode structure spaced apart from the first electrode structure, and an electrolyte layer between the first electrode structure and the second electrode structure, wherein the first electrode structure includes a current collector layer, and a plurality of active material plates electrically connected to the current collector layer, protruding from the current collector layer, and including an active material, wherein each plate of the plurality of active material plates has a width and a length greater than the width, and the plurality of active material plates are spaced apart from one another in a widthwise direction and in a lengthwise direction, and wherein the second electrode structure extends between the plurality of active material plates along the widthwise direction and between the plurality of active material plates along the lengthwise direction.

The plurality of active material plates may include a first active material plate, and a second active material plate spaced apart from the first active material plate in the lengthwise direction, the first active material plate may have a first end surface facing the second active material plate, and the second active material plate has a second end surface facing the first end surface, and the second electrode structure may cover at least a portion of each of the first end surface and the second end surface.

The electrolyte layer may extend between the plurality of active material plates along the widthwise direction and between the plurality of plates along the lengthwise direction.

According to an aspect of another embodiment, a method of manufacturing a secondary battery includes providing a first stack structure comprising a plurality of active material sheets and a plurality of first sacrificial layer sheets, wherein the plurality of active material sheets and the plurality of first sacrificial layer sheets are alternately stacked; cutting the first stack structure into a plurality of first stack structures; forming a second stack structure comprising the plurality of first stack structures and a plurality of second sacrificial layer sheets, wherein the plurality of first stack structures and the plurality of second sacrificial layer sheets are alternately stacked; cutting the second stack structure into a plurality of second stack structures; providing a substrate comprising a conductive layer on a surface of the substrate; and disposing the plurality of second stack structures on the conductive layer.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which:

FIG. 6A is a graph of relative energy density (percent, %) versus unit cell length (millimeters, mm), showing a change in relative energy density (%) according to the length of a unit cell when a module is formed of a plurality of unit cells (battery cells) employing the 3D electrode structure;

FIGS. 6B and 6C are illustrations of the cells at points A and B in FIG. 6A, respectively;

FIGS. 8A and 8B are cross-sectional views illustrating a portion of a section of a secondary battery manufactured by sequentially forming an electrolyte layer and a second electrode structure in the 3D electrode structure (first electrode structure) of FIG. 7;

FIGS. 12A and 12B are cross-sectional views illustrating a portion of a section of a secondary battery manufactured by sequentially forming an electrolyte layer and a second electrode structure in a 3D electrode structure (first electrode structure), according to an embodiment;

FIGS. 13A and 13B are perspective views illustrating an example of a process of forming an electrolyte layer in a 3D electrode structure according to an embodiment;

DETAILED DESCRIPTION

Figure 1:
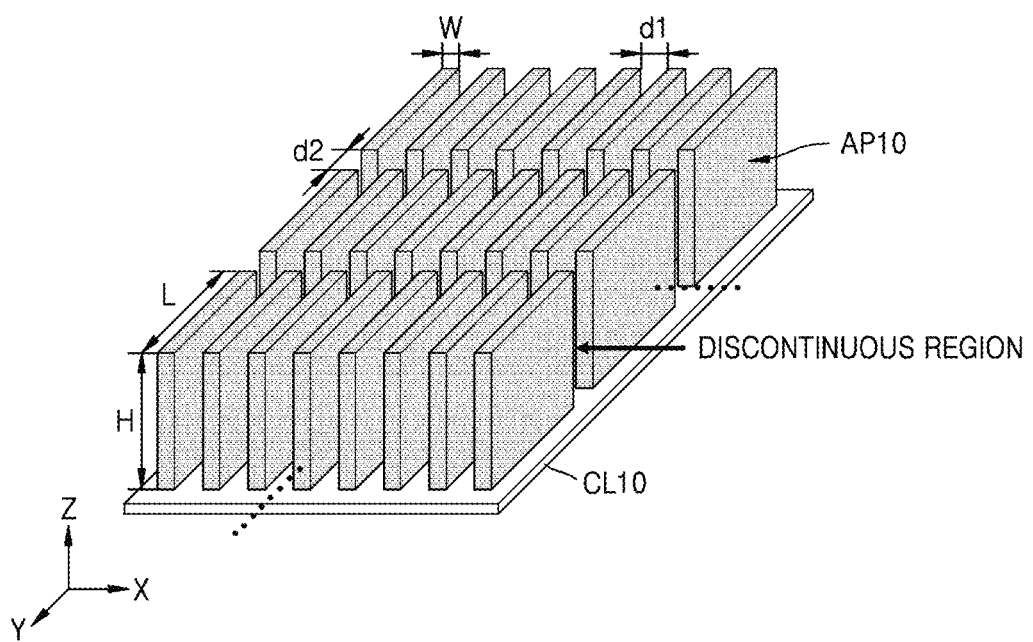
FIG. 1 is a perspective view of a three-dimensional (3D) electrode structure according to an embodiment.

Various example embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. "Or" means "and/or." As used herein, the term "and/or" includes any and all combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Reference will now be made in detail to three-dimensional (3D) electrode structures according to embodiments, and secondary batteries including the same and manufacturing methods thereof, examples of which are illustrated in the accompanying drawings, wherein like reference numerals refer to like elements throughout. Also, the size of each layer illustrated in the drawings may be exaggerated for convenience of explanation and clarity.

Figure 2:
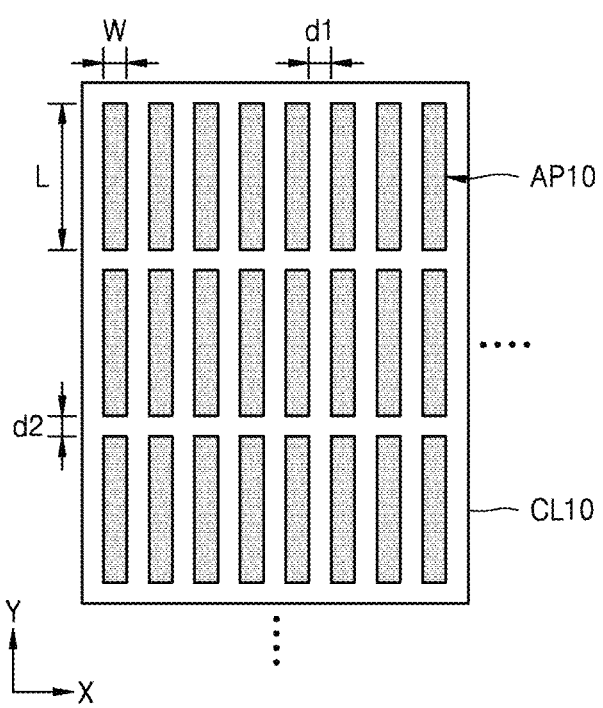
FIG. 2 is a plan view of the 3D electrode structure of FIG. 1.

FIG. 1 is a perspective view of a three-dimensional (3D) electrode structure according to an embodiment. FIG. 2 is a plan view of the 3D electrode structure of FIG. 1 as viewed at the top of the 3D electrode structure.

Referring to FIGS. 1 and 2, the 3D electrode structure according to the present embodiment may include a current collector (e.g., current collecting) layer CL10. The current collecting layer CL10 may be a first electrode current collector, for example, a cathode current collector. The current collecting layer CL10 may have a plate shape. In this case, the current collecting layer CL10 may be also referred to as a current collecting plate. The current collecting layer CL10 may include at least one conductive material, for example, Cu, Au, Pt, Ag, Zn, Al, Mg, Ti, Fe, Co, Ni, Ge, In, and/or Pd. The current collecting layer CL10 may be a metal layer, but may also be a layer formed of a conductive material other than metal.

A plurality of active material plates AP10, which are electrically connected to the current collecting layer CL10, may be arranged so as to protrude from the current collecting layer CL10. The active material plates AP10 may be perpendicular to a surface of the current collecting layer CL10. The active material plates AP10 may be spaced apart from each other at an interval and may be parallel to one another. The active material plates AP10 may include, for example, a cathode active material. Although the active material plates AP10 are named "active material plate" because they include an active material, it does not mean that the active material plates AP10 are formed of only an active material. The active material plates AP10 may further include other materials in addition to the active material.

Each of the active material plates AP10 may have a width (thickness) W, a height H, and a length L. The length L is greater than the width W. For example, each of the active material plates AP10 may have the width W extending in an X-axis direction and the length L extending in a Y-axis direction that is perpendicular to the X-axis direction. Each of the active material plates AP10 may have a height H in a Z-axis direction, and which is perpendicular to a widthwise direction (the X-axis direction) and to a lengthwise direction (the Y-axis direction). That is, the height H is in a direction perpendicular to the current collecting layer CL10. In other words, in each of the active material plates AP10 a length extending in a Z-axis direction is referred to as the height H. The height H may be greater than the width W and less than the length L. In this connection, a ratio of the height H to the width W may be referred to as a height aspect ratio (AR), and a ratio of the length L to the width W may be referred to as a length AR.

The active material plates AP10 may be spaced apart from one another in the widthwise and lengthwise directions. Accordingly, an empty space may be present between the active material plates AP10 in the widthwise direction. Furthermore, an empty space may be present between the active material plates AP10 in the lengthwise direction. The empty space between the active material plates AP10 along the lengthwise direction may be referred to as a "discontinuous region". In this regard, the active material plates AP10 may have a discontinuous structure in the lengthwise direction. A gap d1 in the widthwise direction of the active material plates AP10 may be referred to as a first gap, and a gap d2 in the lengthwise direction may be referred to as a second gap.

Each of the active material plates AP10 may have a width (thickness) W of about 5 micrometers (μm) or greater, or about 7 μm or greater, or about 10 μm or greater. The height H may be greater than the width W. The ratio of the height H to the width W, that is, the height AR, may be about 4 or greater, or about 10 or greater, or about 20 or greater. The length L may be greater than the height H. In a detailed example, the width W of each of the active material plates AP10 may be about 5 μm to about 100 μm. The height H of each of the active material plates AP10 may be about 50 μm to 1000 μm. The length L of each of the active material plates AP10 may be about 70 μm to 1200 μm. However, specific values of the width W, the height H, and the length L presented herein are exemplary and may vary. For example, the width W may be greater than 100 μm, the height H may be greater than 1000 μm, and the length L may be greater than 1200 μm. The distance of the gap d1 in the widthwise direction of the active material plates AP10 may be about 50% or greater, or about 75% or greater, or about 95% or greater of the width (thickness) W of an active material plate. Similarly, the distance of the gap d2 in the lengthwise direction of the active material plates AP10 may be about 50% or greater, or about 75% or greater, or about 95% or greater of the width (thickness) W. In a detailed example, the first gap d1 may be about 2.5 μm to about 100 μm, or about 3 μm to about 100 μm, or about 5 μm to 100 μm. The second gap d2 may be about 2.5 μm to about 200 μm, or about 4 μm to about 200 μm, or about 5 to 200 μm. However, the numerical ranges of the first and second gaps d1 and d2 presented herein are exemplary and may vary. For example, the first gap d1 may be greater than about 100 μm, and the second gap d2 may be greater than about 200 μm.

The active material plates AP10 may include a cathode active material. For example, the active material plates AP10 may include a Li-containing oxide. The Li-containing oxide may be an oxide including Li and transition metal. The Li-containing oxide may be, for example, $LiMO_2$ (M=metal), where M may include Co, Ni, Mn, or a combination thereof. In a detailed example, $LiMO_2$ may be $LiCoO_2$. The cathode active material may include a ceramic of a cathode composition, or may be polycrystalline or single crystal. However, the specific materials presented herein as the cathode active material are not limited, and other cathode active materials may be used.

The 3D electrode structure of the present embodiment may be a "3D cathode structure". In this case, the current collecting layer CL10 may be a cathode current collecting layer, and the active material plates AP10 may be a cathode active material plates. The structures illustrated in FIGS. 1 and 2 may correspond to a 3D electrode structure which is applicable to one unit cell (battery cell).

When an electrode has a 3D structure having the active material plates AP10 that are perpendicular, or substantially perpendicular, to the current collecting layer CL10 formed on the current collecting layer CL10, the capacity and energy density may be increased in comparison with a two-dimensional, planar type, electrode structure. Without being limited by theory, since a 3D electrode structure has a high active material volume fraction and a wide reaction area compared with the planar type electrode structure, there is an improvement in the energy density and the rate capability of a secondary battery.

Also, since the active material plates AP10 are spaced apart from one another in the widthwise and lengthwise directions, and the empty spaces are present between the active material plates AP10, an electrolyte layer may be easily formed on the active material plates AP10 by various methods. When a secondary battery including the active material plates AP10 is manufactured, the generation of stress and a resulting stress concentration phenomenon may be prevented during charging and discharging of the secondary battery, and thus various problems due to stress may be prevented. Accordingly, a secondary battery having superior stability and durability, while having a high capacity and a high energy density, may be implemented.

Figure 3:
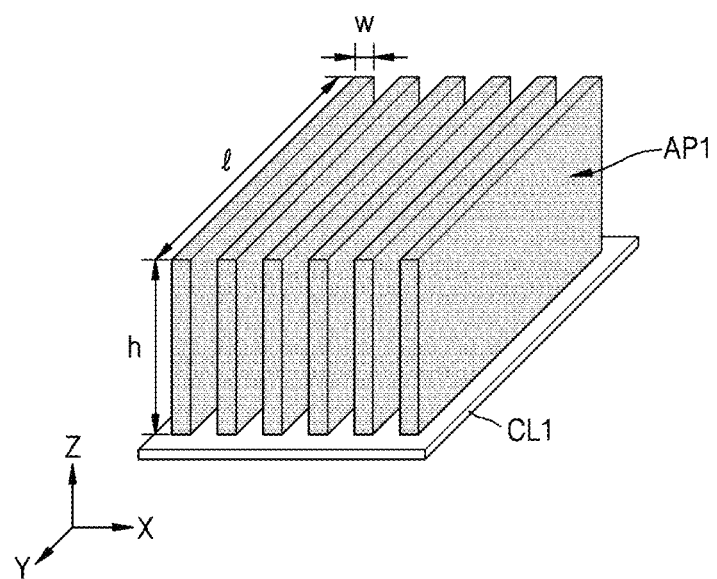
FIG. 3 is a perspective view of an electrode structure according to a comparative example.

FIG. 3 is a perspective view of an electrode structure according to a comparative example.

Referring to FIG. 3, the electrode structure according to a comparative example may include a current collecting layer CL1 and the active material plates AP1 provided on one surface of current collecting layer CL1. The active material plates AP1 may be arranged on the current collecting layer CL1 to be spaced apart from one another in a widthwise direction (X-axis direction). Each of the active material plates AP1 may have a structure that is continuous in a lengthwise direction (Y-axis direction).

The electrode structure according to a comparative example, unlike the electrode structure according to the embodiment of FIG. 1, does not include a discontinuous region in the lengthwise direction (e.g., Y-axis direction) of the active material plates AP1. In this case, it may be difficult to increase the length l of each of the active material plates AP1, and furthermore, it may be difficult to increase the height h thereof. When the length l or the height h of each of the active material plates AP1 is increased, there is a problem in that the active material plates AP1 may be bent or may collapse. Furthermore, a gap between the active material plates AP1 may become irregular. Accordingly, it may be difficult to implement active material plates AP1 having a high height aspect ratio, that is, a high ratio of the height h to the width w. Furthermore, it may be difficult to increase the length of the electrode structure. As a result, in the electrode structure according to a comparative example, it may be difficult to provide a high energy density and structural stability.

Figure 4A:
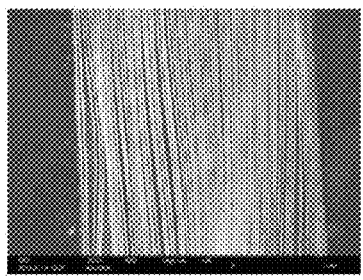
FIGS. 4A to 4C are scanning electron microscope (SEM) images of the electrode structure according to the comparative example in FIG. 3.
Figure 4B:
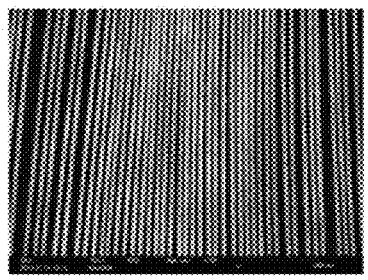
Figure 4C:
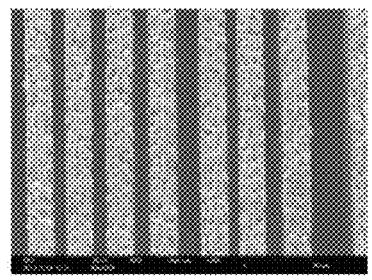

FIGS. 4A to 4C are scanning electron microscope (SEM) images showing the problems associated with the electrode structure according to a comparative example having the structure of FIG. 3. The electrode structure according to a comparative example is formed under various conditions, and the images are captured from the above the electrode structure, that is, as a top view.

Referring to FIGS. 4A to 4C, in the electrode structure of the comparative example, the active material plates are bent or collapsed and the gap therebetween may become irregular. Due to these problems, it may be difficult to form an electrolyte and an anode active material on the electrode structure (cathode structure). Even when a battery cell is formed, due to reaction non-uniformity (irregularity) and structural instability, performance of a secondary battery may be deteriorated and life thereof may be shortened.

Figure 5:
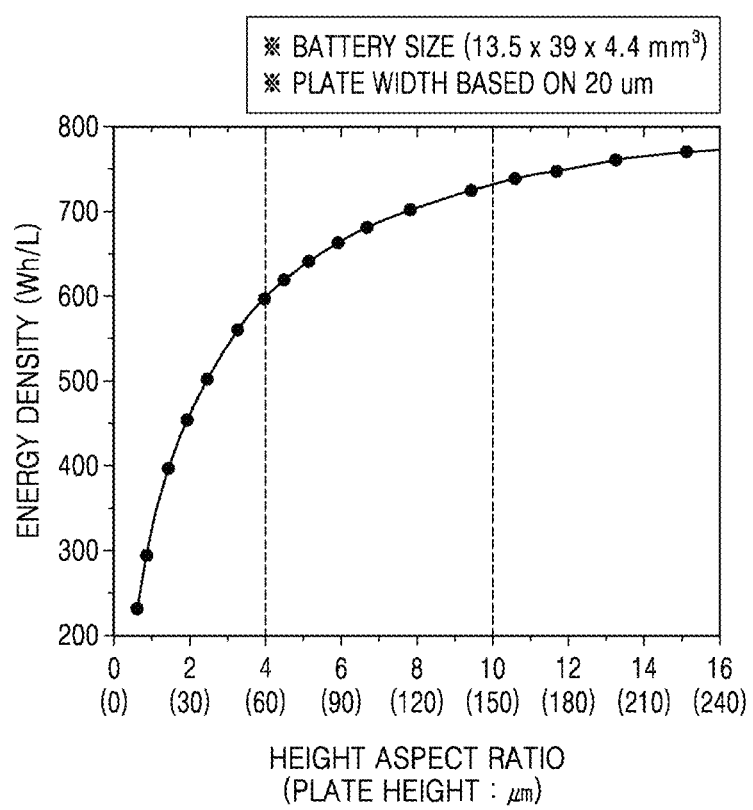
FIG. 5 is a graph of energy density (watt hours per liter, Wh/L) versus plate height aspect ratio (plate height, micrometers (μm)), showing a change in energy density according to a height aspect ratio of a plurality of active material plates in the 3D electrode structure. The numbers in parenthesis along the X axis of FIG. 5 indicate the height (μm) of the active material plate.

FIG. 5 is a graph showing a change in the energy density according to a height aspect ratio (height AR) of the active material plates in the 3D electrode structure. The 3D electrode structure has the structure of FIG. 3 (comparative example), and the energy density is the energy density of a secondary battery employing the 3D electrode structure. The size of the secondary battery is 13.5 mm×39 mm×4.4 mm, and the width (thickness) of an active material plate is 20 μm. The numbers in parenthesis under the X axis of FIG. 5 indicate the height (μm) of the active material plate.

Referring to FIG. 5, it may be seen that as the height AR of the active material plates increases, the energy density of the secondary battery increases. However, since it is difficult to implement a height AR of 4 or greater with the electrode structure of FIG. 3 according to a comparative example, it may be difficult to obtain a high energy density. Meanwhile, since a height AR of 4 or greater, or a height AR of 10 or greater, can be implemented by using the electrode structure according to the embodiment described with reference to FIG. 1, a high energy density of about 600 watt hours per liter (Wh/L) or greater, or about 650 Wh/L or greater, or about 700 Wh/L or greater may be secured.

FIG. 6A is a graph showing a change in relative energy density (%) according to the length of a unit cell when a module is formed of a plurality of unit cells (battery cells) employing the 3D electrode structure. FIGS. 6B and 6C are illustrations of the cells at points A and B in FIG. 6A, respectively. The 3D electrode structure has the structure of FIG. 3 according to the comparative example. The size of a module is 10 mm×30 mm, and a gap distance between a plurality of unit cells forming a module is 0.15 mm. As the length of a unit cell increases, the number of unit cells to form a module decreases.

Referring to FIGS. 6A to 6C, it may be seen that, as the length of a unit cell increases, the relative energy density increases. For example, when the size of a unit cell is 1 mm×3.2 mm, the relative energy density is about 100%, and when the size of a unit cell is 5.9 mm×3.2 mm, the relative energy density is about 112%. In other words, as the length of a unit cell increases from 1 mm to 5.9 mm, the relative energy density may increase about 12%. Accordingly, as described in the embodiment of FIGS. 1 and 2, as the length of a unit cell is increased by including the discontinuous region, the energy density of a secondary battery may be increased. However, it may be difficult to increase the length of a unit cell to 1 mm or greater in the structure of FIG. 3 according to the comparative example. Meanwhile, by using the structure according to the present embodiment, the length of a unit cell may be easily increased to about 3 mm or more or about 10 mm or more, and consequently, the energy density of a secondary battery may be increased. When the height AR is increased by increasing the height of an active material plate and simultaneously increasing the length of a unit cell, advantageous effects may be obtained, and thus the energy density of a secondary battery may be further improved.

The structure of FIG. 1 may correspond to the 3D electrode structure which is applicable to one unit cell (battery cell). The number of the active material plates AP10 in the X-axis direction and the number of active material plates AP10 in the Y-axis direction, are not limited to those illustrated in FIG. 1, and may vary. For example, more active material plates than the number of the active material plates AP10 illustrated in FIG. 1 may be used for one unit cell region.

Figure 7:
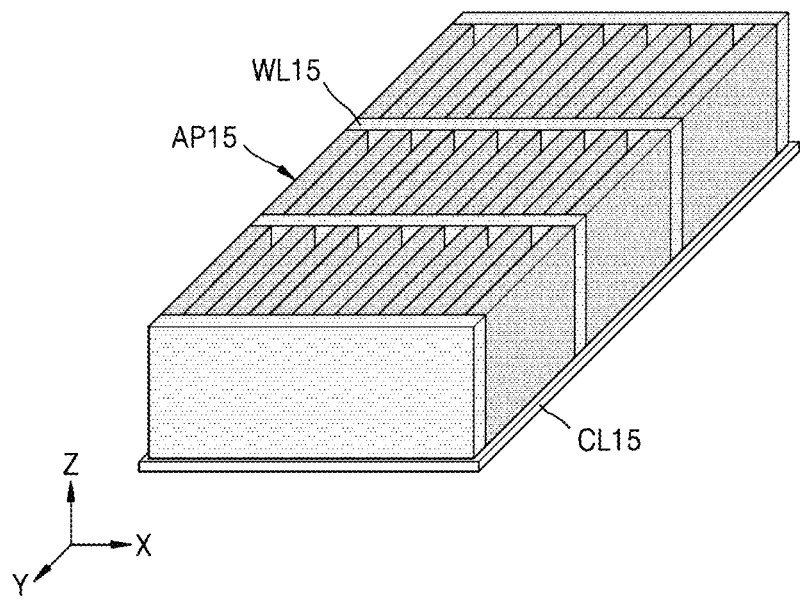
FIG. 7 is a perspective view of a 3D electrode structure according to a comparative example.

FIG. 7 is a perspective view of a 3D electrode structure according to a comparative example.

Referring to FIG. 7, a plurality of partition walls WL15 may be provided on a current collecting layer CL15 to be spaced apart from one another in a direction, for example, in the Y-axis direction. The active material plates AP15 may be provided between two adjacent partition walls WL15. The partition wall WL15 may be perpendicular to the active material plates AP15. The partition wall WL15 may include an active material having the same composition as the active material plates AP15 or an active material having a different composition therefrom. Alternatively, the partition wall WL15 may include a non-active material. The 3D electrode structure according to the comparative example in FIG. 7 may be similar to a case in which the partition wall WL15 is provided between the active material plates AP10 in the lengthwise direction in the structure of FIG. 1.

A secondary battery may be formed to include an electrolyte layer and another electrode structure (second electrode structure) sequentially formed in the 3D electrode structure (first electrode structure) of FIG. 7.

FIGS. 8A and 8B are cross-sectional views illustrating a portion of a section of a secondary battery manufactured by sequentially forming an electrolyte layer and another electrode structure (second electrode structure) in the 3D electrode structure (first electrode structure) of FIG. 7. FIG. 8A shows an initial charge state, while FIG. 8B shows a final charge state.

Referring to FIG. 8A, the active material plates AP15 may include a first active material, for example, a cathode active material. Accordingly, the active material plates AP15 may be referred to as the first active material plates AP15. The partition wall WL15 may be disposed between the first active material plates AP15 in a lengthwise direction thereof. Furthermore, an electrolyte layer E15 and a second active material member AP25 may be provided. The second active material member AP25 may include a second active material, for example, an anode active material. The electrolyte layer E15 may be between the first active material plates AP15 and the second active material member AP25.

Referring to FIG. 8B, at a final stage of charge, the volume of the second active material member AP25 may increase and thus stress may be generated. In particular, stress may be concentrated at the partition wall WL15 and a peripheral area thereof. Moreover, when the partition wall WL15 includes an active material, the active material of the partition wall WL15 participates in the reaction of a secondary battery, and thus stress may be much generated at the partition wall WL15 and a peripheral area thereof. Accordingly, problems due to the stress may be generated. For example, there is a possibility that problems such as a structural defect (crack, etc.), reaction non-uniformity (irregularity), and reduction of life may result.

Figure 9A:
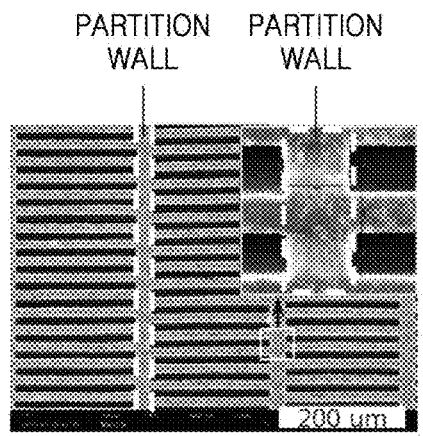
FIGS. 9A, 9B, 10A, and 10B are SEM images showing a problem caused by a partition when an electrolyte layer is formed in the 3D electrode structure of FIG. 7.
Figure 9B:
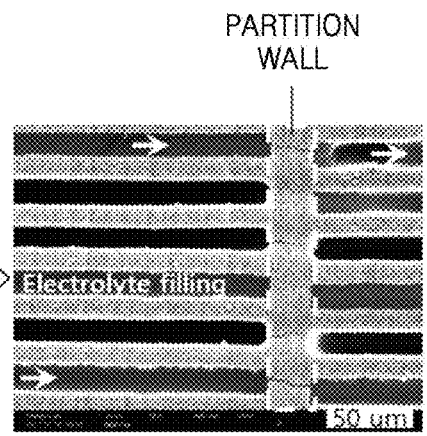
Figure 10A:
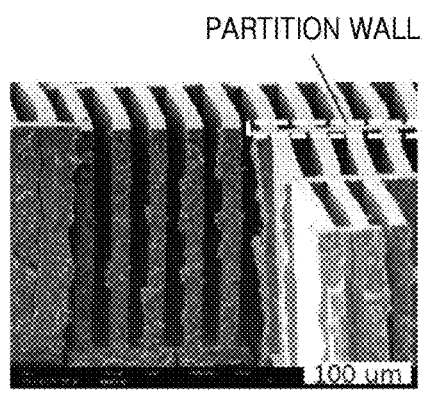
Figure 10B:
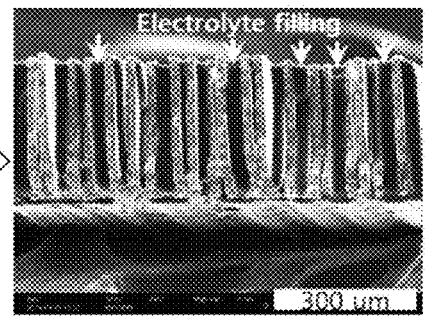

FIGS. 9A, 9B, 10A, and 10B are SEM images showing a problem caused by the presence of a partition when an electrolyte layer is formed in the 3D electrode structure according to the comparative example of FIG. 7. FIGS. 9A and 9B are SEM images of the 3D electrode structure captured from the above the 3D electrode structure, that is, as a top view. FIGS. 10A and 10B are SEM images of the 3D electrode structure captured from the side of the 3D electrode structure, that is, as a side view. FIGS. 9A and 10A are images before spin coating of the electrolyte by and FIGS. 9B and 10B are images taken after the spin coating of the electrolyte.

Referring to FIGS. 9A, 9B, 10A, and 10B, when the electrolyte is formed in the 3D electrode structure that is closed by the partition wall, it is difficult to uniformly coat the 3D electrode structure with the electrolyte due to the presence of the partition wall. A gap or opening area in the 3D electrode structure, that is, a valley area, may be clogged by the electrolyte. Furthermore, as stress is generated, the 3D structure may collapse. Accordingly, it may be not be possible to effectively form the electrolyte on the 3D electrode structure closed by the partition wall WL15 using a spin coating or dip coating method, as illustrated in FIG. 7.

Figure 11:
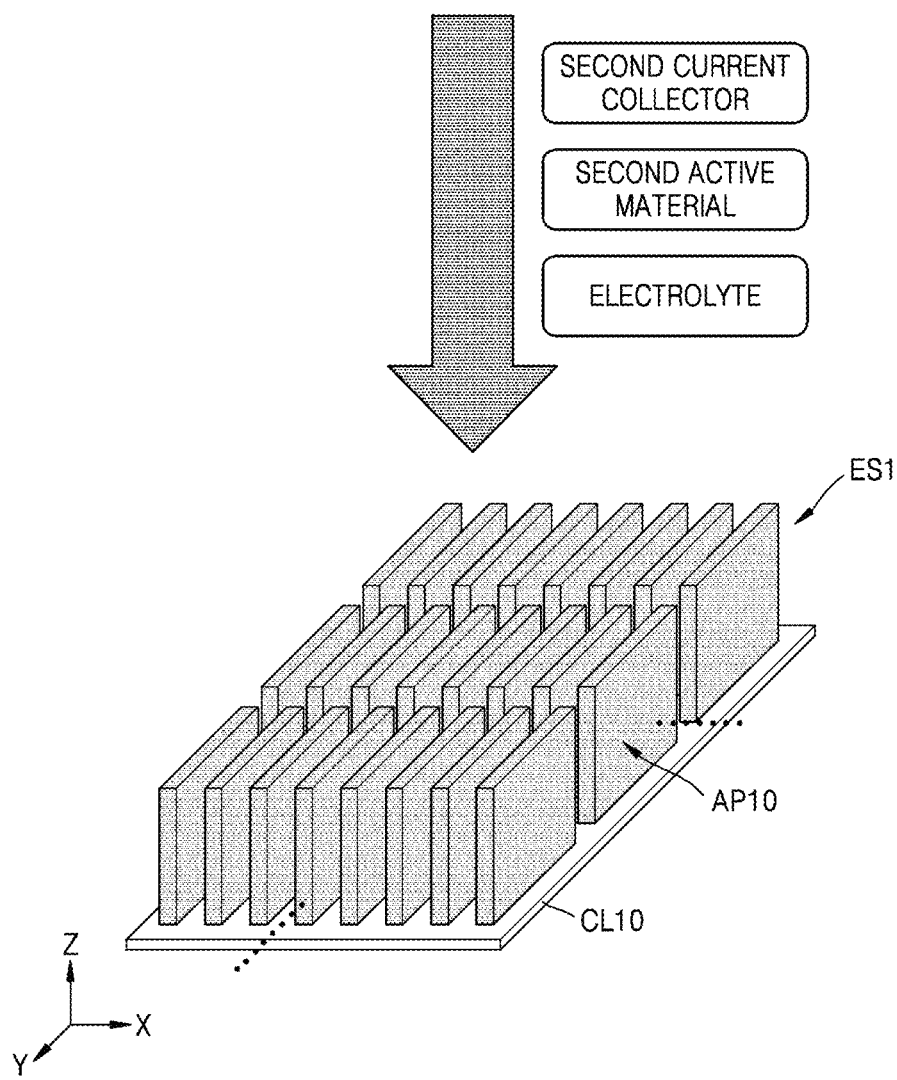
FIG. 11 illustrates a method of manufacturing a secondary battery including a 3D electrode structure, according to an embodiment.

FIG. 11 illustrates a method of manufacturing a secondary battery including a 3D electrode structure, according to an embodiment.

Referring to FIG. 11, a secondary battery may be manufactured by sequentially forming an electrolyte layer, a second active material, and a second current collecting layer in a 3D electrode structure ES1, according to the present embodiment. The 3D electrode structure ES1 may have various structures corresponding to the electrode structure described with reference to FIGS. 1 and 2, or modified therefrom. The secondary battery may be, for example, a lithium (Li) secondary battery. However, the present inventive concept is not limited thereto, and the type of a secondary battery may be changed in various ways.

FIGS. 12A and 12B are cross-sectional views illustrating a portion of a section of a secondary battery manufactured by sequentially forming an electrolyte layer and another electrode structure (second electrode structure) in a 3D electrode structure (first electrode structure) according to an embodiment. FIG. 12A shows an initial charge state, and FIG. 12B shows a final charge state.

Referring to FIG. 12A, the active material plates AP10 may be spaced apart from one another in the X-axis direction (widthwise direction) and in the Y-axis direction (lengthwise direction). The active material plates AP10 may be the first active material plates AP10 including a first active material, for example, a cathode active material. The 3D electrode structure according to the present embodiment may further include an electrolyte layer E10 and a second active material member AP20. The second active material member AP20 may include a second active material, for example, an anode active material. The electrolyte layer E10 may be between the first active material plates AP10 and the second active material member AP20.

The electrolyte layer E10 may cover both end surfaces of each of the first active material plates AP10 along the lengthwise direction (Y-axis direction). Furthermore, the electrolyte layer E10 may cover both side surfaces of each of the first active material plates AP10 along the widthwise direction (X-axis direction). The electrolyte layer E10 may be formed to entirely cover all of the exposed surfaces of each of the first active material plates AP10. Accordingly, the first active material plates AP10 include a first plate and a second plate spaced apart from the first plate in the lengthwise direction, the first plate has a first end surface corresponding to the second plate, the second plate has a second end surface corresponding to the first end surface, and the electrolyte layer E10 may cover each of the first and second end surfaces. Furthermore, the first active material plates AP10 in the widthwise direction may include a third plate, the first plate has a first side surface corresponding to the third plate, the third plate has a second side surface corresponding to the first side surface, and the electrolyte layer E10 may cover each of the first and second side surfaces.

The second active material member AP20 may be conformally formed over the electrolyte layer E10, thus corresponding to the shape thereof. The second active material member AP20 may extend toward a gap in the widthwise direction of the first active material plates AP10 and toward a gap in the lengthwise direction thereof. Furthermore, an "empty space" defined by outer surfaces of the second active material member AP20 may be present between the first active material plates AP10. In other words, the gaps between the first active material plates AP10 may be partially, and not fully, filled by the second active material member AP20. For example, the second active material member AP20 may fill about 75% or less, or about 50% or less, or about 25% or less of the gap between the first active material plates AP10 in a widthwise direction, and gap between the first active material plates AP10 in a lengthwise direction.

Referring to FIG. 12B, at a final charge stage, the volume of the second active material member AP20 may increase. Since an empty space is present between the first active material plates AP10 in the widthwise and lengthwise directions, even when the volume of the second active material member AP20 increases, stress is not generated or is hardly generated. Even when stress is generated, the stress may have very low strength or may be uniformly distributed. Accordingly, the problems due to the stress may be prevented or reduced. Also, the problems such as a structural defect (crack, etc.), reaction non-uniformity (irregularity), or reduction of lifespan may be prevented or reduced.

FIGS. 13A and 13B are perspective views illustrating an example of a process of forming an electrolyte layer in a 3D electrode structure according to an embodiment. The present embodiment shows a process of forming an electrolyte layer by a spin coating method.

Referring to FIG. 13A, the electrolyte layer E10 may be formed coating the 3D electrode structure ES1 with a solution containing an electrolyte, that is, an electrolyte solution EE10. The electrolyte may be a solid electrolyte and the electrolyte solution EE10 may be in a sol-gel state. Since the 3D electrode structure ES1 has an open structure in which a space (gap) is present between the active material plates AP10 in the widthwise and lengthwise directions, the electrolyte layer E10 may be easily formed by the spin coating method. The electrolyte layer E10 may be uniformly, or relatively uniformly, coated without the problems associated with presence of the partition wall WL15 of FIG. 7, for example, a flow of the electrolyte solution EE10 is prevented and/or a non-coating area is generated.

Although a method of forming the electrolyte layer E10 by the spin coating method is described herein, a dip coating method may also be used. Alternatively, the electrolyte layer E10 may be formed by using a deposition method such as atomic layer deposition (ALD), chemical vapor deposition (CVD), physical vapor deposition (PVD), etc. Furthermore, the electrolyte layer E10 may be formed over multiple times by using a layer by layer (LBL) method.

Figure 14A:
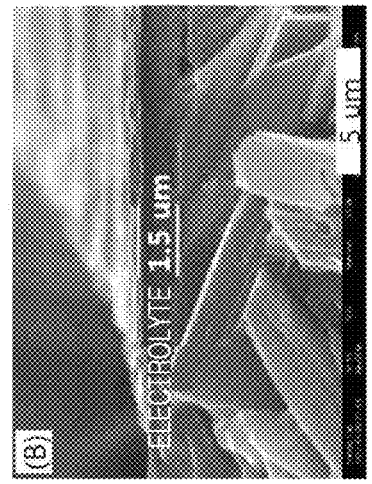
FIGS. 14A to 14D are a set of SEM images showing a state of an electrolyte layer formed by a spin coating method in a 3D electrode structure, according to an embodiment.
Figure 14B:
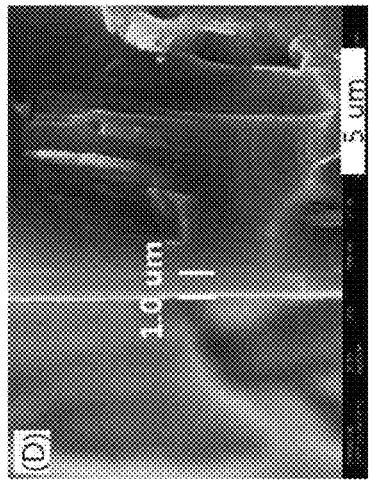
Figure 14C:
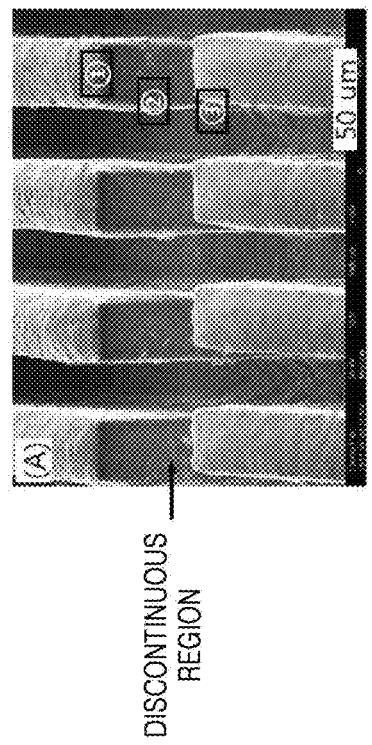
Figure 14D:

FIGS. 14A to 14D are SEM images showing a state of an electrolyte layer (solid electrolyte layer) formed by a spin coating method in a 3D electrode structure according to an embodiment. FIG. 14A, an image shows an overall structure, and in FIGS. 14B to 14D, the images show enlarged sections of different areas of the image in FIG. 14A. The image in FIG. 14B is an enlargement of area ① in FIG. 14A, that is, the electrolyte layer on a top side of the plate. The image in FIG. 14C is an enlargement of area ② in FIG. 14A, that is, the electrolyte layer formed in the discontinuous region. The image in FIG. 14D is an enlargement of area ③ in FIG. 14A, that is, the electrolyte layer on a bottom side of the plate.

Referring to FIGS. 14A to 14D, it may be seen that the electrolyte layer covers each of the active material plates. The electrolyte layer may be formed to cover all surface extending from the top side of the active material plates to the bottom side thereof. In other words, according to the present embodiment, the step coverage properties of the electrolyte layer may be superior. According to the present embodiment, it may be seen that side step coverage is superior because the thickness of the electrolyte layer formed in the bottom side of the active material plate relative to the thickness of the electrolyte layer formed on the top side of the active material plate is about 66%.

Figure 15:
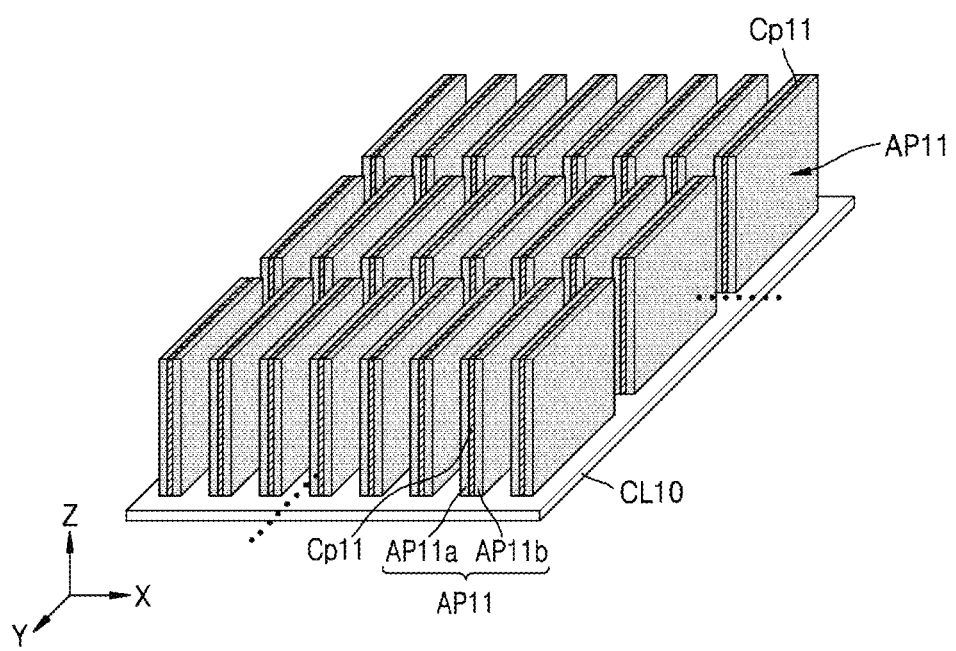
FIG. 15 is a perspective view of a 3D electrode structure according to another embodiment.

According to another embodiment, an inner current collecting layer may be provided in the active material plates AP10, and an example thereof is illustrated in FIG. 15.

Referring to FIG. 15, an inner current collecting layer Cp11 may be provided in each active material plate of a plurality of active material plates AP11. In other words, each of the active material plates AP11 may include the inner current collecting layer Cp11 therein. Each of the active material plates AP11 may be divided into two parts (AP11a and AP11b) by the inner current collecting layer Cp11. In other words, a first plate part AP11a may be provided at one side of the inner current collecting layer Cp11, and a second plate part AP11b may be provided at the other side of the inner current collecting layer Cp11. The inner current collecting layer Cp11 may have the same height as the active material plates AP11. In some cases, the inner current collecting layer Cp11 may have a height lower than the active material plates AP11. The inner current collecting layer Cp11 may be formed of a material that is the same as, or similar to, the material used to form the current collecting layer CL10. For example, the inner current collecting layer Cp11 may include at least one of, for example, Cu, Au, Pt, Ag, Zn, Al, Mg, Ti, Fe, Co, Ni, Ge, In, or Pd. The inner current collecting layer Cp11 may be electrically connected to, and in contact with, the current collecting layer CL10. The inner current collecting layer Cp11 provides a smooth movement of electric charges between the current collecting layer CL10 and the first and second plate parts AP11a and AP11b. Accordingly, the characteristics/performance of the 3D electrode structure may be improved by the inner current collecting layer Cp11.

According to another embodiment, the current collecting layer CL10 includes a composite of a conductor and an active material (conductor-active material composite). An example thereof is illustrated in FIG. 16.

Figure 16:
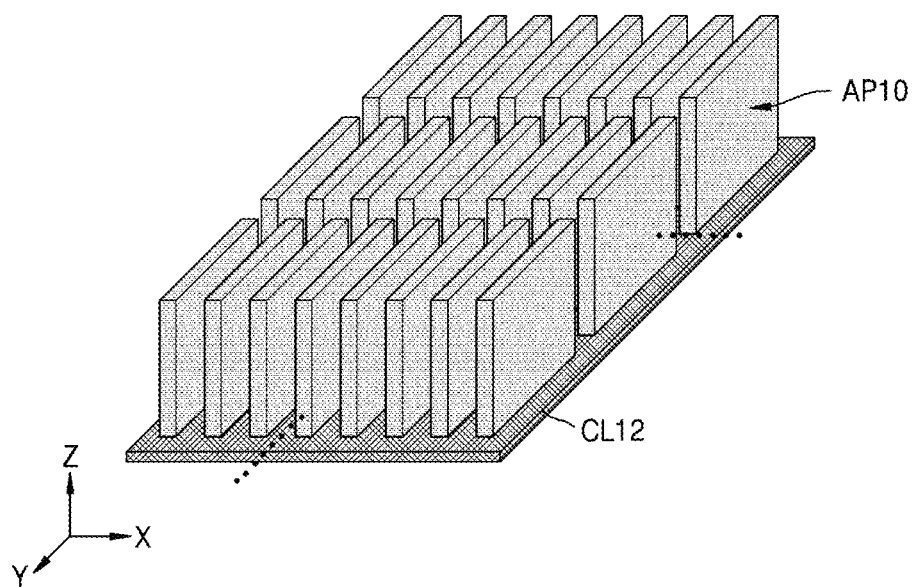
FIG. 16 is a perspective view of a 3D electrode structure according to another embodiment.

Referring to FIG. 16, a current collecting layer CL12 may include a sintered composite of a conductor and an active material. In the following description, the sintered composite is referred to as a "conductor-active material composite". A conductor included in the current collecting layer CL12, that is, a conductor included in the conductor-active material composite, may include, for example, at least one of Cu, Au, Pt, Ag, Zn, Al, Mg, Ti, Fe, Co, Ni, Ge, In, Pd, Cr, W, or Mo. The conductor may be a metal or a conductive material other than metal. An active material included in the current collecting layer CL12, that is, an active material included in the conductor-active material composite, may be a cathode active material. For example, the cathode active material may include a Li-containing oxide. The Li-containing oxide may be an oxide including Li and transition metal. The Li-containing oxide may be, for example, $LiMO_2$ (M=metal), where M may be any one of Co, Ni, Mn, or a combination thereof. In a detailed example, the $LiMO_2$ may be $LiCoO_2$. The cathode active material may include a ceramic of a cathode composition, or may be polycrystalline or single crystal. However, the specific materials of the cathode active material presented herein are not limited, and other cathode active materials may be used.

In the conductor-active material composite, a content of an active material may be, for example, about 30 vol % or less, or about 25 vol % or less, or about 20 vol % or less, based on a total volume of the conductor-active material composite. The content of the active material may be about 1 vol % to about 30 vol %, or about 2 vol % to about 25%, or about 5 vol % to about 20%, based on a total volume of the conductor-active material composite. Accordingly, in the conductor-active material composite, the content of the active material may be less than a content of the conductor, for example, metal. In this case, the conductor-active material composite may maintain a high electric conductivity similar to a general conductive layer, for example, a metal layer. Furthermore, a bonding force between the current collecting layer CL12 and the active material plates AP10 may be improved by the active material included in the conductor-active material composite. By applying the conductor-active material composite to the current collecting layer CL12, the electric conductivity of the current collecting layer CL12 is retained, while the bonding force to the active material plates AP10 is increased, and thus structural stability may be improved.

Figure 17:
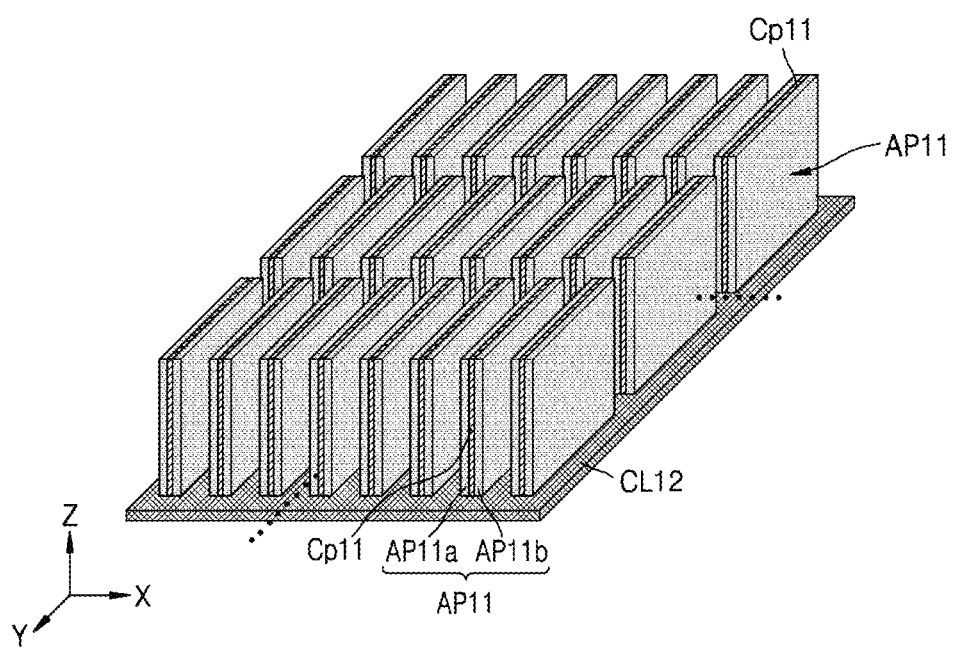
FIG. 17 is a perspective view of a 3D electrode structure according to another embodiment.

According to another embodiment, the current collecting layer CL12 of FIG. 16 may be applied as the current collecting layer CL10 in the structure of FIG. 15, and an example thereof is illustrated in FIG. 17.

Referring to FIG. 17, the current collecting layer CL12 may include the conductor-active material composite. In other words, the current collecting layer CL12 may correspond to the current collecting layer CL12 of FIG. 16. The active material plates AP11 provided on the current collecting layer CL12 may be identical to the active material plates AP11 described in FIG. 15. In other words, the active material plates AP11 may include the inner current collecting layer Cp11 therein, and each of the active material plates AP11 may be divided into the two parts AP11a and AP11b by the inner current collecting layer Cp11.

Figure 18:
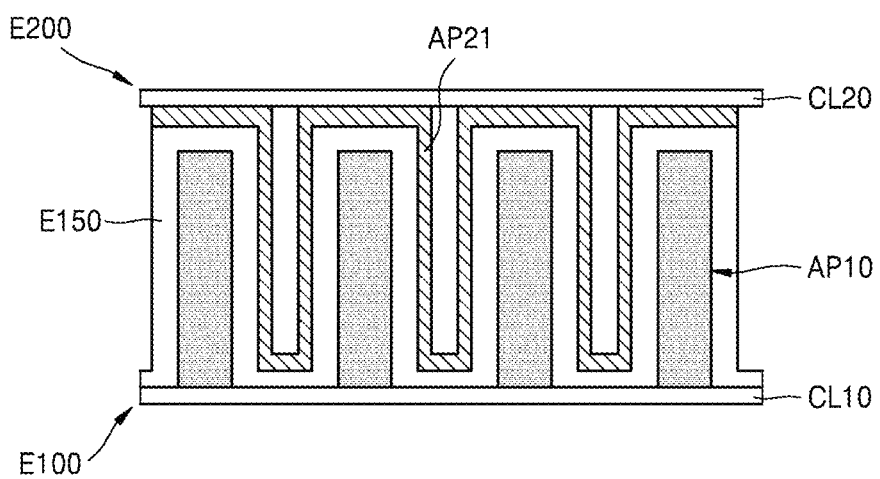
FIG. 18 is a cross-sectional view of a second battery including a 3D electrode structure according to an embodiment.

FIG. 18 is a cross-sectional view of a second battery including a 3D electrode structure according to an embodiment. In the present embodiment, a sectional structure of a secondary battery is manufactured by sequentially forming an electrolyte layer and a second electrode structure in the 3D electrode structure of FIG. 11.

Referring to FIG. 18, the 3D electrode structure of the present embodiment may include a first electrode structure E100 and a second electrode structure E200 spaced apart from the first electrode structure E100. An electrolyte layer E150 may be provided between the first electrode structure E100 and the second electrode structure E200.

The first electrode structure E100 may be any one of the 3D electrode structures described with reference to FIG. 1 and FIGS. 15 to 17, or may have a modified structure thereof. For example, the first electrode structure E100 may include the first current collecting layer CL10 and the first active material plates AP10. The first current collecting layer CL10 and the first active material plates AP10 may respectively correspond to the current collecting layer CL10 and the active material plates AP10 of FIG. 1. The first electrode structure E100 may be a cathode. In this case, the first current collecting layer CL10 and the first active material plates AP10 may be a cathode current collecting layer and a cathode active material plate, respectively. Each of the first active material plates AP10 may further include a first inner current collecting layer (not shown).

The electrolyte layer E150 covering the first active material plates AP10 may be provided on the first current collecting layer CL10. The electrolyte layer E150 may have a meandering shape conforming to the shape of the first active material plates AP10. The electrolyte layer E150 may include a solid electrolyte. For example, the electrolyte layer E150 may include a solid electrolyte such as $Li_3PO_4$, $Li_3PO_4$-xNx, $LiBO_2$-xNx, $Li_3PO_4Nx$, $LiBO_2Nx$, $Li_4SiO_4$—$Li_3PO_4$, $Li_4SiO_4$—$Li_3VO_4$, $Li_7La_3Zr_2O_{12}$ (LLZO), or a combination thereof. Furthermore, the electrolyte layer E150 may include a polymer electrolyte. In addition, the material and shape of the electrolyte layer E150 may be changed in various ways.

The second electrode structure E200 may include a second current collecting layer CL20. The second current collecting layer CL20 may be face the first current collecting layer CL10. The second electrode structure E200 may include a second active material member AP21 electrically connected to, and in contact with, the second current collecting layer CL20. The second active material member AP21 electrically contacting the second current collecting layer CL20 may have a structure extending between the first active material plates AP10. In the second active material member AP21, a portion extending between the first active material plates AP10 may have a plate shape. Accordingly, in the second active material member AP21, the portions extending between the first active material plates AP10 may be referred to as "a plurality of second active material plates". In this case, the first active material plates AP10 and the second active material plates may be alternately arranged. The electrolyte layer E150 may be provided between the first active material plates AP10 and the second active material member AP21. The second electrode structure E200 may be an anode. In this case, the second current collecting layer CL20 may be an anode current collecting layer, and the second active material member AP21 may include an anode active material. The anode active material may include, for example, a Li metal, a carbon-based material, a silicon-based material, an oxide, or a combination thereof. The anode current collecting layer may include at least one of, for example, Cu, Au, Pt, Ag, Zn, Al, Mg, Ti, Fe, Co, Ni, Ge, In, or Pd. However, the specific materials of the anode active material and the anode current collecting layer presented herein are exemplary and may vary. Furthermore, although FIG. 18 illustrates only four first active material plates AP10 and three second active material members AP21, these are exemplary and the number of the first active material plates AP10 and the second active material members AP21 may vary.

The structure of the secondary battery described with reference to FIG. 18 may be one battery cell (unit cell). A stacked secondary battery may be formed by stacking the battery cells, and an example thereof is illustrated in FIG. 19.

Figure 19:
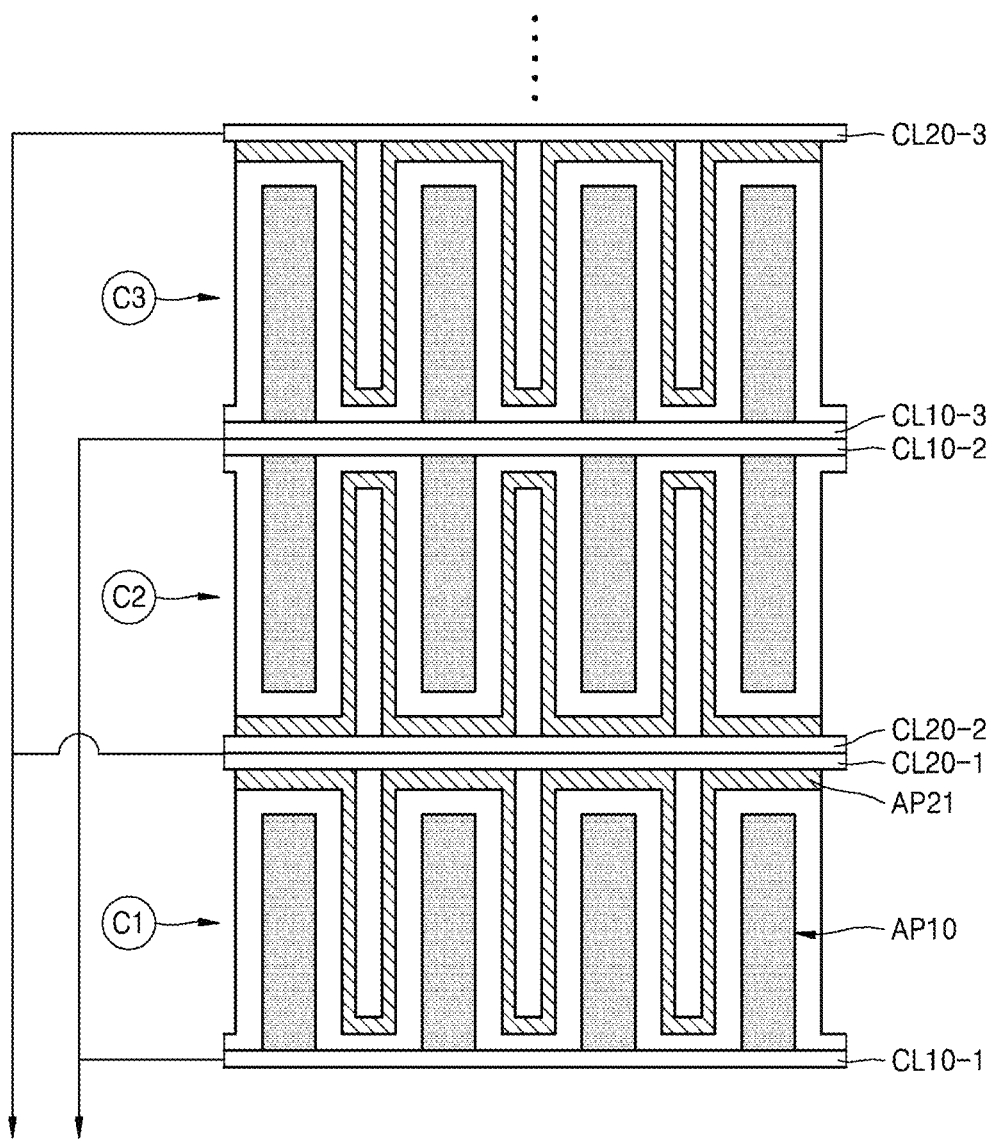
FIG. 19 is a cross-sectional view of a stacked secondary battery including a 3D electrode structure according to another embodiment.

FIG. 19 is a cross-sectional view of a stacked secondary battery including a 3D electrode structure according to another embodiment.

Referring to FIG. 19, a stacked secondary battery may be formed by stacking a plurality of battery cells C1, C2, and C3, each of which is equivalent to the battery cell described with reference to FIG. 18. Although the battery cells C1, C2, and C3 include a first battery cell C1, a second battery cell C2, and a third battery cell C3, the number is not limited thereto and the number of battery cells may vary. The first battery cell C1 may have the same structure as the structure of FIG. 18. The second battery cell C2 may have a structure that is the same as the structure of FIG. 18, but inverted upside down. The third battery cell C3 may have the same structure as the structure of FIG. 18. Accordingly, the battery cells C1, C2, and C3 may be stacked such that current collectors having the same polarity come in contact with (i.e., face) one another. In other words, if a cathode current collecting layer of the first battery cell C1 is a first cathode current collecting layer CL10-1, an anode current collecting layer thereof is a first anode current collecting layer CL20-1, a cathode current collecting layer of the second battery cell C2 is a second cathode current collecting layer CL10-2, and an anode current collecting layer is a second anode current collecting layer CL20-2, then the first anode current collecting layer CL20-1 and the second anode current collecting layer CL20-2 may be arranged to contact (face) each other Furthermore, if a cathode current collecting layer of the second battery cell C3 is a third cathode current collecting layer CL10-3 and an anode current collecting layer thereof is a third anode current collecting layer CL20-3, then the second cathode current collecting layer CL10-2 and the third cathode current collecting layer CL10-3 may be arranged to contact (face) each other. Accordingly, odd-numbered battery cells C1 and C3 may have inverted structures with respect to an even-numbered battery cell C2. The cathode current collecting layers CL10-1, CL10-2, and CL10-3 may be electrically connected to one another, and the anode current collecting layers CL20-1, CL20-2, and CL20-3 may be electrically connected to one another. Furthermore, the two current collecting layers contacting each other, for example, CL20-1 and CL20-2, may be formed as a single integrated layer. As such, when a stacked secondary battery is formed by stacking the battery cells C1, C2, and C3, secondary battery capacity per unit area may be much increased.

Although FIG. 19 illustrates and describes a case in which a plurality of battery cells are stacked by changing their directions (vertical directions) thereof, according to another embodiment, the battery cells may be stacked without changing the directions (vertical directions) of the cells. In other words, a plurality of battery cells, each having a structure and a direction that are equivalent to those of the battery cell of FIG. 18, may be stacked in a single (e.g., same) direction. In this case, an insulation layer may be provided between two adjacent battery cells, to prevent current collecting layers of different polarities from contacting each other.

In the structures of FIGS. 18 and 19, although the first electrode structure E100 is illustrated and described to have the 3D electrode structure described with reference to FIG. 1, the first electrode structure E100 may have any of the various structures as described with reference to FIGS. 15 to 17. Furthermore, the specific structures of the second electrode structure E200 illustrated and described in FIGS. 18 and 19 are exemplary, and may be modified in various ways. The modified structure of the second electrode structure E200 is described with reference to FIGS. 20 and 21.

Figure 20:
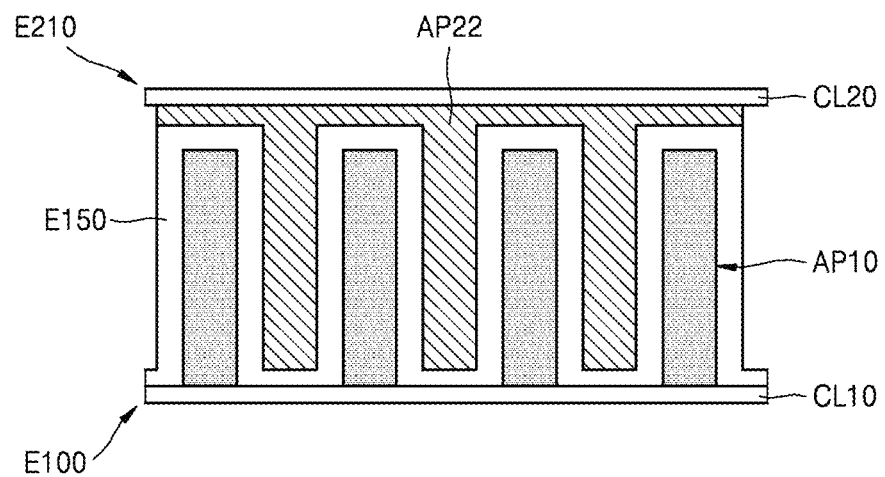
FIG. 20 is a cross-sectional view of a secondary battery including a 3D electrode structure according to another embodiment.

A second electrode structure E210 of FIG. 20 may include the second current collecting layer CL20 and a second active material member AP22 electrically connected thereto. The second active material member AP22 may include a portion contacting the second current collecting layer CL20 and having a plate shape and a plurality of portions, each having a plate shape, extending from the above portion and filling a space between the first active material plates AP10. While in the structure of FIG. 18 the second active material member AP21 partially, and not entirely, fills the space (gap) between the first active material plates AP10, in the structure of FIG. 20, the second active material member AP22 may completely (or mostly) fill the space (gap) between the first active material plates AP10. That is, the second active material member AP22 may fill about 98%, or about 99%, or about 100% of the space between the first active material plates AP10.

Figure 21:
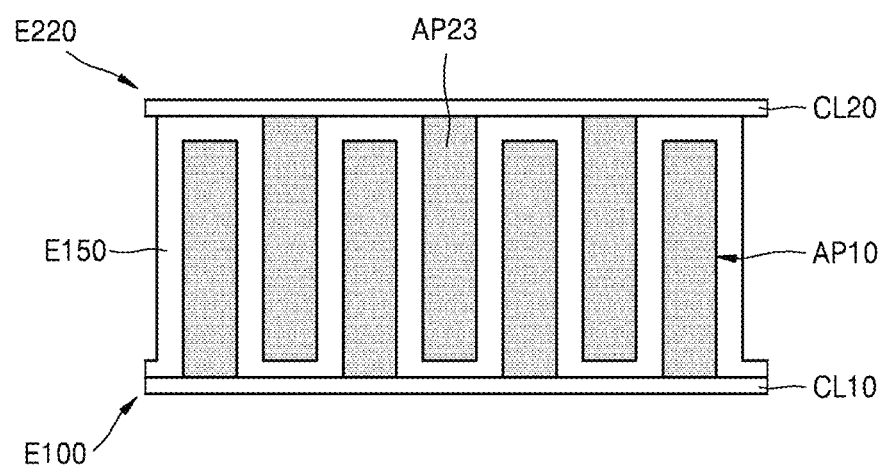
FIG. 21 is a cross-sectional view of a secondary battery including a 3D electrode structure according to another embodiment.

A second electrode structure E220 of FIG. 21 may include the second current collecting layer CL20 and a plurality of second active material plates AP23 electrically connected thereto. The second active material plates AP23 may be "anode active material plates". Although it is not illustrated, each of the second active material plates AP23 may further include a second inner current collecting layer therein. The second inner current collecting layer may electrically contact the second current collecting layer CL20. The second inner current collecting layer may be formed from a conductor such as metal.

In FIGS. 20 and 21, the structures other than the structures of the second electrode structures E210 and E220 may be the same as or similar to the structure described with reference to FIG. 18.

As illustrated in FIGS. 20 and 21, when the second active material members AP22 and AP23 completely (or mostly) fill the space between the first active material plates AP10, the type of second active material used for the second active material members AP22 and AP23 may be different from the type of second active material used for the second active material member AP21 of FIG. 18. In other words, the type of the second active material may determine whether an empty space defined by the second active material member AP21 is left between the first active material plates AP10 as illustrated in FIG. 18, or whether the second active material members AP22 and AP23 are formed to prevent an empty space as illustrated in FIGS. 20 and 21. When the second active material members AP22 and AP23 are disposed without empty space as illustrated in FIGS. 20 and 21, the gaps (d1 and d2 of FIG. 1) between the first active material plates AP10 may be greater than that in the case of FIG. 18. For example, when a carbon-based material, such as graphite or a porous material, is used as the second active material, the second active material members AP22 and AP23 may be formed without empty space as illustrated in FIGS. 20 and 21.

In some cases, for example, in FIGS. 18 and 20, the second active material members AP21 and AP22 and the second current collecting layer CL20 may be formed as a single integrated element. In other words, a portion of each of the second active material members AP21 and AP22 may be used as a current collector. In this case, the second current collecting layer CL20 may not be separately formed.

FIGS. 22A to 22C are SEM images captured from above a 3D electrode structure formed according to an embodiment, that is, a top view.

Figure 22:
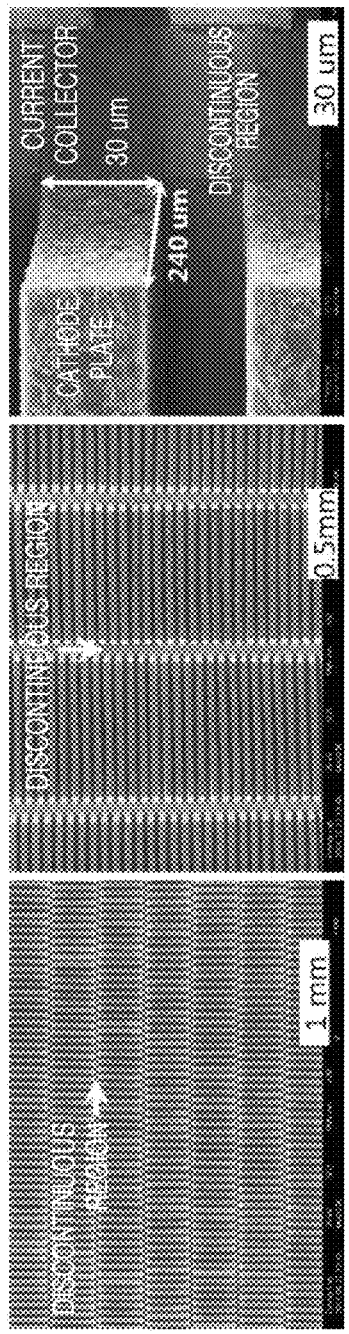
FIGS. 22A to 22C are a set of SEM images captured from a position above a 3D electrode structure formed according to an embodiment.

Referring to FIG. 22, it may be seen that a plurality of active material plates are regularly (relatively regularly) spaced apart from one another in the widthwise and lengthwise directions. In particular, the active material plates may have a discontinuous region in the lengthwise direction. The active material plate according to the present embodiment may have a height aspect ratio (AR) of about 8.

Figure 23:
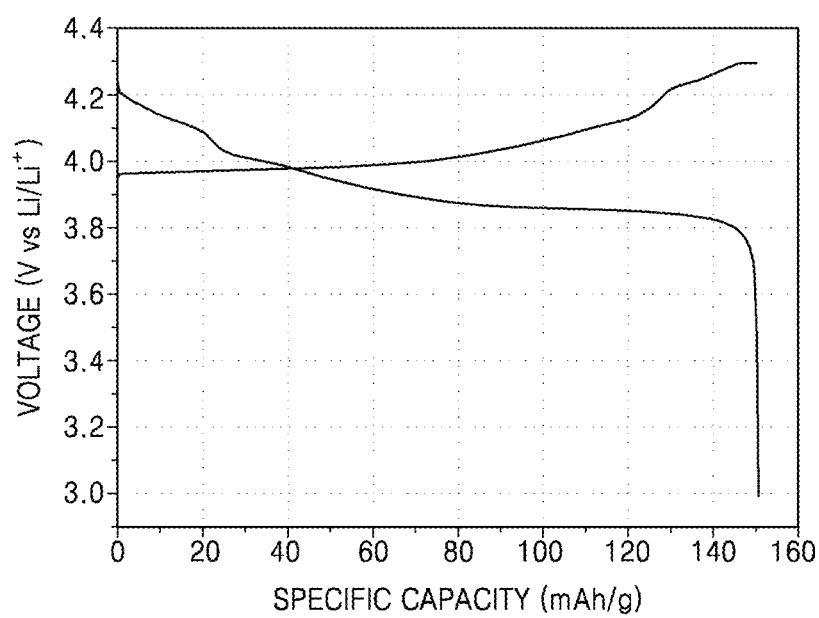
FIG. 23 is a graph of voltage (volts versus lithium, V vs Li/Li$^+$) versus specific capacity (milliampere hour per gram, mAh/g) showing the charge/discharge characteristics of a secondary battery including a 3D electrode structure according to an embodiment.

FIG. 23 is a graph showing the charge/discharge characteristics of a secondary battery including a 3D electrode structure according to an embodiment. Specific capacity-voltage characteristics are evaluated by performing discharge at a C rate of 0.1 C. As used herein, the C rate is a discharge rate of a cell, and is obtained by dividing a total capacity of the cell by a total discharge period of time, e.g., a C rate for a battery having a discharge capacity of 1.6 ampere-hours would be 1.6 amperes.

Referring to FIG. 23, it may be seen that a secondary battery employing a 3D electrode structure according to an embodiment has a high specific capacity of about 151 mAh/g.

In the embodiments of FIGS. 1 and 2, the lengths of the active material plates AP10 are illustrated and described to be all the same or substantially the same. According to another embodiment, at least two plates of the plurality of active material plates AP10 may have different lengths, and an example thereof is illustrated in FIG. 24.

Figure 24:
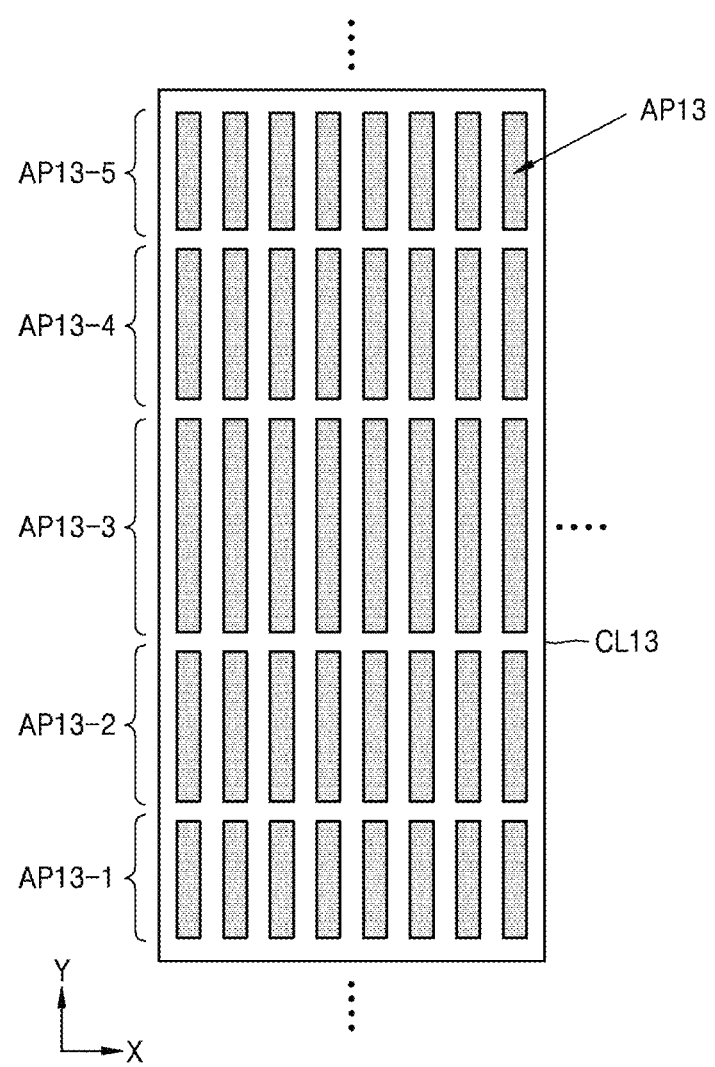
FIG. 24 is a plan view of a 3D electrode structure according to another embodiment.

FIG. 24 is a plan view of a 3D electrode structure according to another embodiment.

Referring to FIG. 24, a plurality of active material plates AP13 may be provided on a current collecting layer CL13. The active material plates AP13 may be spaced apart from one another in the widthwise and lengthwise directions. The plurality of active material plates AP13 may be divided into a plurality of groups. For example, an active material plate AP13-1 of a first group, an active material plate AP13-2 of a second group, an active material plate AP13-3 of a third group, an active material plate AP13-4 of a fourth group, and an active material plate AP13-5 of a fifth group may be disposed from one end to another end in a lengthwise direction (Y-axis direction) of the 3D electrode structure. The active material plate AP13-3 of the third group may be located at or around a center portion of the 3D electrode structure, the active material plate AP13-1 of the first group may be located at or around a first end portion of the 3D electrode structure, and the active material plate AP13-5 of the fifth group may be located at or around an opposite end portion of the 3D electrode structure. The length of the active material plate AP13-1 of the first group may be shorter than the length of the active material plate AP13-3 of the third group. The length of the active material plate AP13-5 of the fifth group may be shorter than the length of the active material plate AP13-3 of the third group. The length of the active material plate AP13-2 of the second group may be shorter than the length of the active material plate AP13-3 of the third group, but longer than the length of the active material plate AP13-1 of the first group. The length of the active material plate AP13-4 of the fourth group may be shorter than the length of the active material plate AP13-3 of the third group, but longer then the length of the active material plate AP13-5 of the fifth group. Accordingly, the length of the plurality of active material plates AP13 may decrease from the center portion of the 3D electrode structure toward a first end or a second opposite end thereof. Due to the varying lengths of the plurality of active material plates AP13, the formation of the electrolyte layer on the 3D electrode structure by a coating method such as spin coating may be even easier than when the length of the plurality of active material plates is uniform. Accordingly, in order to facilitate formation of an electrolyte layer and secure uniform thickness, the lengths of the active material plates AP13 may be formed to be different depending upon where they are positioned, as illustrated in FIG. 24. However, the arrangement method or the number of the active material plates AP13 illustrated in FIG. 24 are exemplary, and may be changed in various ways.

FIGS. 25A to 25K are perspective views illustrating a method of manufacturing a 3D electrode structure according to an embodiment.

Figure 25A:
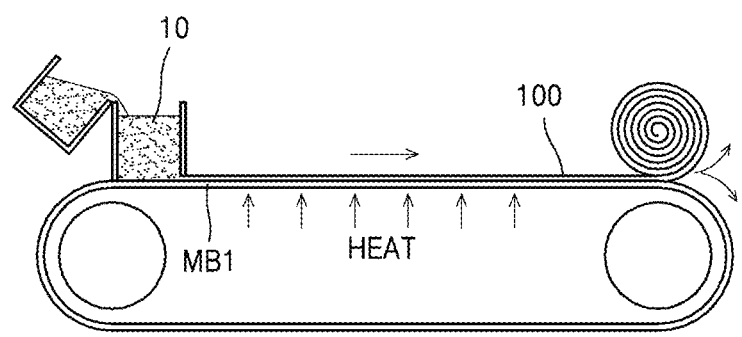
FIGS. 25A to 25K are perspective views illustrating steps in a method of manufacturing a 3D electrode structure according to an embodiment.

Referring to FIG. 25A, after active material slurry 10 is provided (e.g., manufactured), an active material sheet 100 may be formed from the active material slurry 10. For example, active material sheet 100 may be formed from the active material slurry 10 by using a tape-casting method.

The active material slurry 10 may be manufactured by mixing, for example, an active material (powder), a binder, a dispersing agent, a plasticizer, and a solvent. A grinder or a mixing apparatus such as a ball mill may be used to facilitate the mixing. The active material may be a cathode active material, and the cathode active material may include a Li-containing oxide. The Li-containing oxide may be an oxide including Li or transition metal. The Li-containing oxide may be, for example, $LiMO_2$ (M=metal), where M is any one of Co, Ni, Mn, or a combination thereof. In a detailed example, the $LiMO_2$ may be $LiCoO_2$. However, the specific materials the cathode active material presented herein are exemplary, and other cathode active materials may be used therefor.

The active material slurry 10 may be processed into a sheet form by using a shaping apparatus such as a tape-casting apparatus. In this case, the active material slurry 10 may be coated on a moving belt MB1 to a uniform thickness by using a doctor blade, for example. The active material sheet 100 may be formed by drying the active material slurry 10 coated on the moving belt MB1, that is, by evaporating the solvent.

Figure 25B:
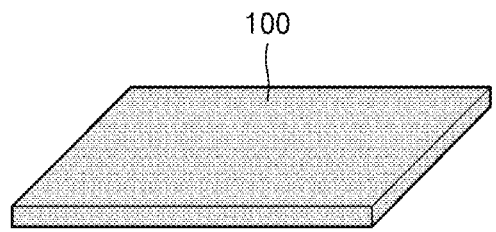

FIG. 25B illustrates the active material sheet 100 formed by the method of FIG. 25A. The active material sheet 100 may have a thickness of, for example, about 1 μm to about 100 μm, or about 5 μm to about 80 μm, or about 7 μm to about 75 μm, but the present disclosure is not limited thereto.

Figure 25C:
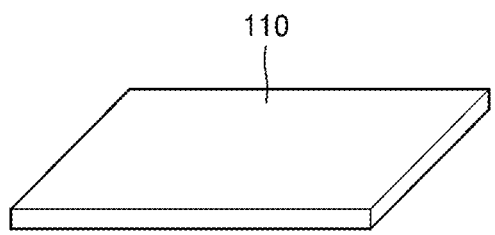

A sacrificial layer sheet 110 as illustrated in FIG. 25C may be formed from sacrificial layer slurry by using a method similar to the method described with reference to FIGS. 25A and 25B. The sacrificial layer slurry may be manufactured by mixing a sacrificial layer material, a binder, a dispersing agent, a plasticizer, etc. with a solvent. For example, a carbon-based material such as graphite may be used as the sacrificial layer material. Alternatively, a Li-containing oxide, a Li-containing carbonate, or a Li-containing chloride may be used as the sacrificial layer material. The Li-containing oxide may include, for example, $Li_2CoSiO_4$, the Li-containing carbonate may include, for example, $Li_2CO_3$, and the Li-containing chloride may include, for example, LiCl. However, the sacrificial layer material is not limited thereto, and other various materials may be used therefor.

Although the sacrificial layer sheet 110 of FIG. 25C may have a thickness of, for example, about 1 μm to about 100 μm, or about 5 μm to about 85 μm, or about 10 μm to about 75 μm, the present disclosure is not limited thereto.

Figure 25D:
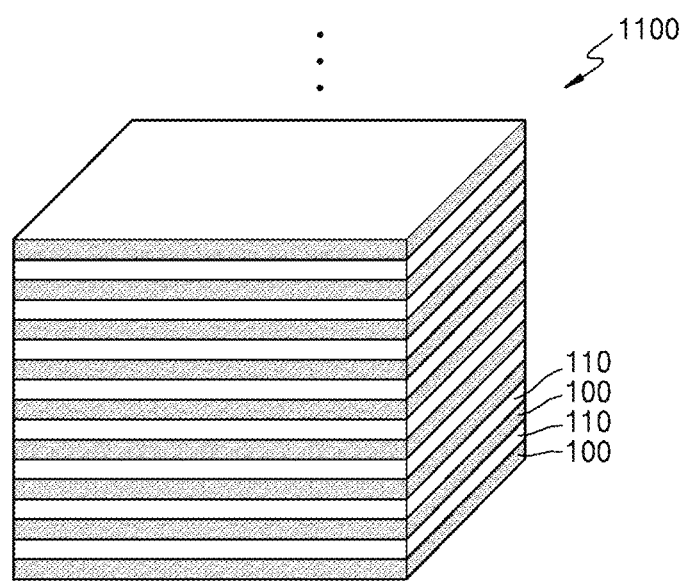

Referring to FIG. 25D, a first stack structure 1100 may be formed by alternately and repeatedly stacking the active material sheet 100 and the sacrificial layer sheet 110. The first stack structure 1100 may be pressed at a certain pressure and at a certain temperature. For example, a pressing process may be performed at around a glass transition temperature (Tg) of a binder material included in the active material sheet 100. In a detailed example, the pressing process may be performed at a pressure of about 3,000 to 10,000 pounds per square inch (psi) and at a temperature of about 80 to 100° C. The pressing process may include, for example, a warm isostatic pressing (WIP) process.

Figure 25E:
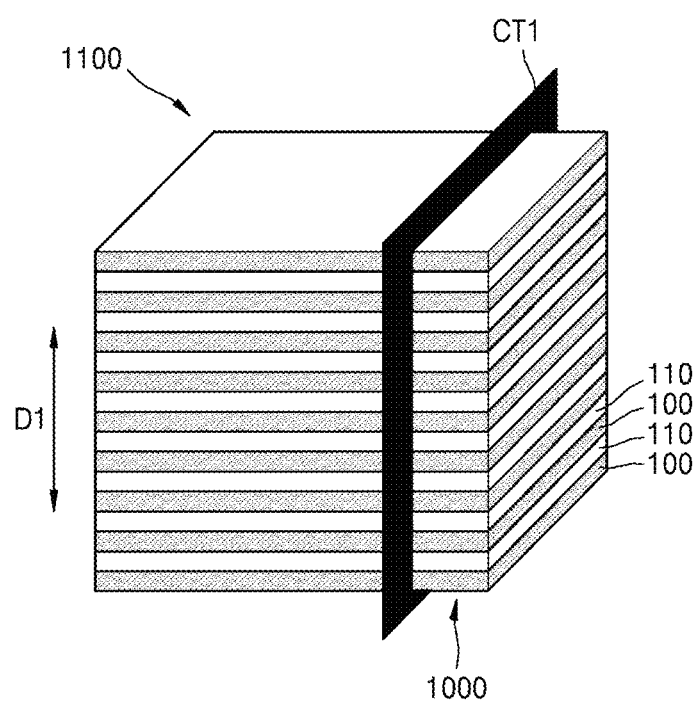

Referring to FIG. 25E, the first stack structure 1100 may be cut into a plurality of first stack structures 1000 having a desired size (thickness) by using a cutting member CT1. Although FIG. 25E illustrates one cut first stack structure 1000, a plurality of cut first stack structures 1000 may be obtained by repeating a cutting process. This may be referred to as a dicing process with respect to the first stack structure 1100. The cutting process may be performed in a direction (first direction D1) parallel to a stacking direction. A blade cutter or wire saw may be used as the cutting member CT1.

Figure 25F:
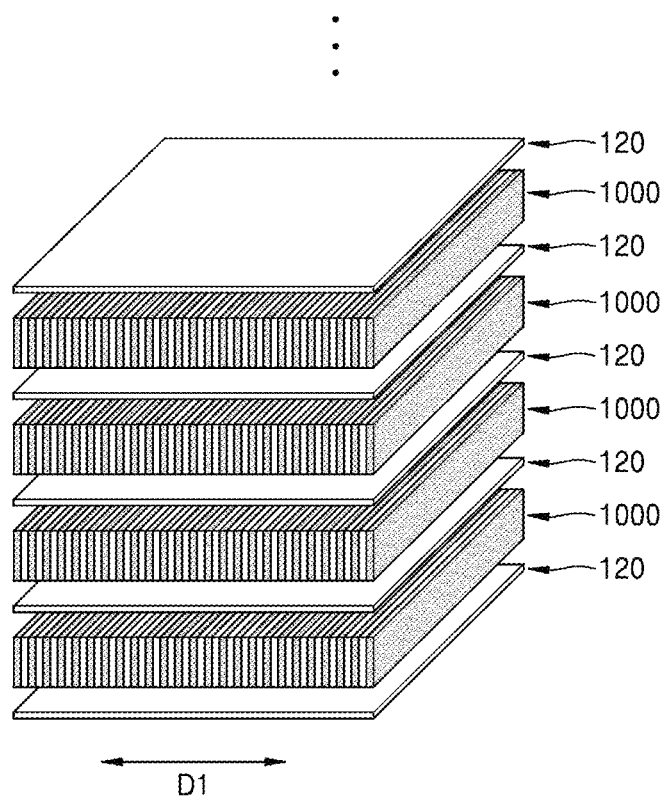

Referring to FIG. 25F, the cut first stack structure 1000 and a second sacrificial layer sheet 120 are alternately and repeatedly stacked on each other. While the cut first stack structure 1000 is arranged parallel to the first direction D1, the stacking process may be performed in a direction perpendicular to the first direction D1. The material of the second sacrificial layer sheet 120 may be the same as or similar to the material of the sacrificial layer sheet 110 described with reference to FIG. 25C. Although the second sacrificial layer sheet 120 may have a thickness of, for example, about 1 μm to about 200 μm, or about 5 μm to about 150 μm, or about 10 μm to about 100 μm, the present disclosure is not limited thereto.

Figure 25G:
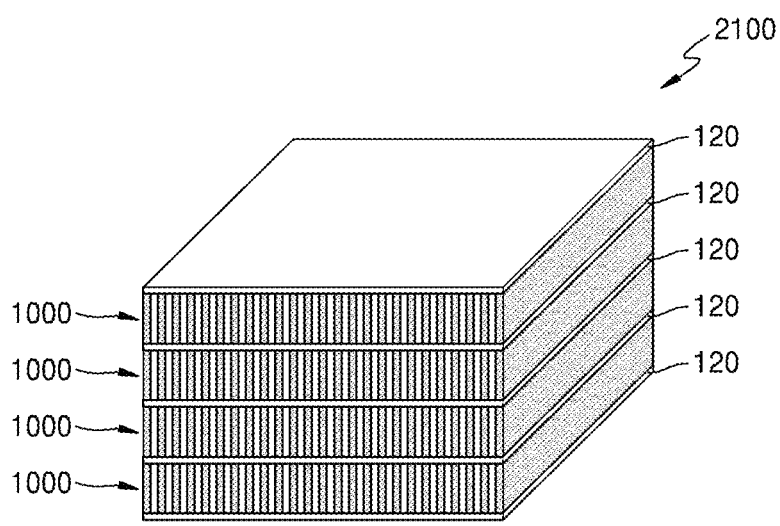

FIG. 25G illustrates a second stack structure 2100 formed through the stacking process of FIG. 25F. The second stack structure 2100 may be pressed at a certain pressure and at a certain temperature. For example, a pressing process may be performed at abound a glass transition temperature (Tg) of a binder material included in the second sacrificial layer sheet 120. The pressing process may include, for example, a warm isostatic pressing (WIP) process.

Figure 25H:
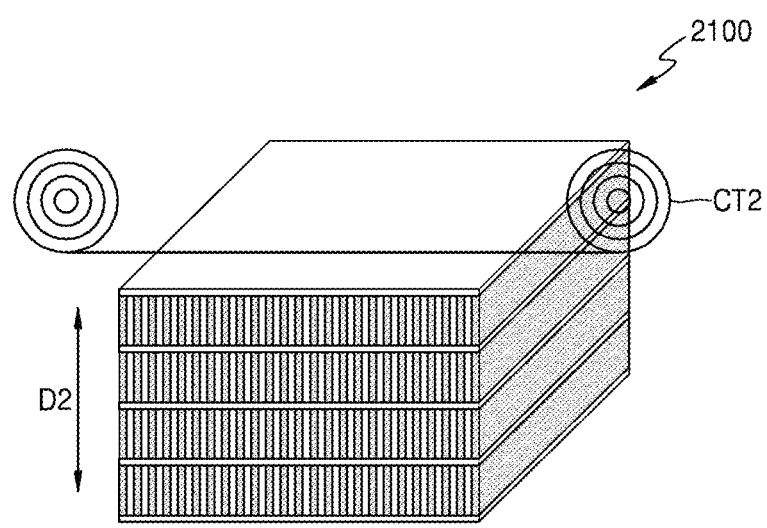
Figure 25I:
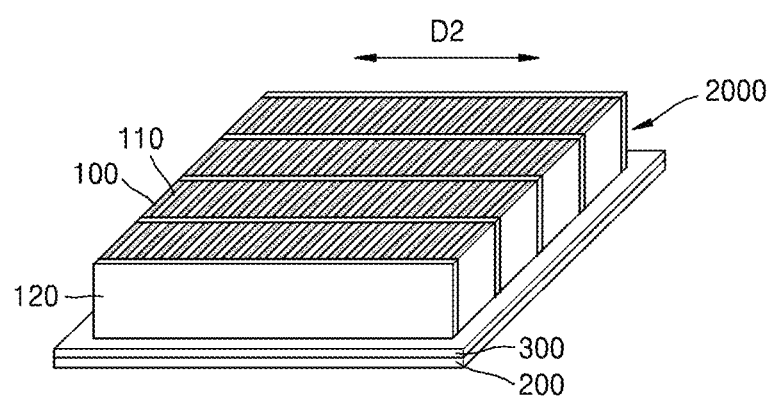

Referring to FIG. 25H, the second stack structure 2100 is cut to a desired size (thickness) by using a cutting member CT2, thereby dividing the second stack structure 210 into a plurality of second stack structures (2000 of FIG. 25I). This may be referred to as a dicing process with respect to the second stack structure 2100. The cutting process may be performed in a direction (second direction D2) parallel to the stacking direction (stacking direction of FIG. 25F). A blade cutter or a wire saw may be used as the cutting member CT2.

Referring to FIG. 25I, the cut second stack structures 2000 may be arranged on a substrate structure. For example, after a conductive paste layer 300 is formed on a substrate 200, the cut second stack structures 2000 may be attached on the conductive paste layer 300. The substrate 200 may be formed of a carbon-based material such as graphite. The conductive paste layer 300 may be, for example, a paste including a metal or a conductive material other than metal. In some cases, the substrate 200 may not be used, and a conductive film other than the conductive paste layer 300 may be used.

Figure 25J:
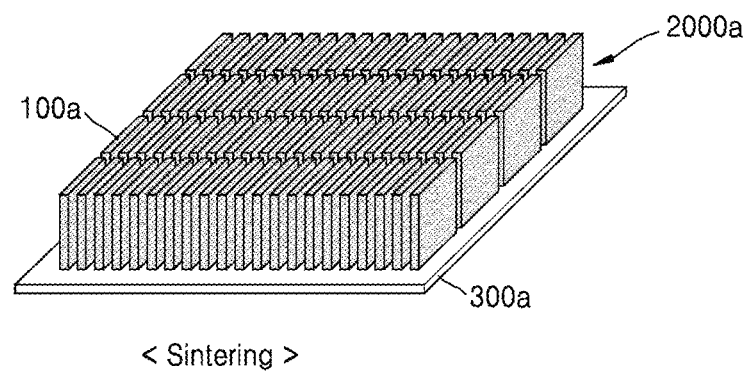

Referring to FIG. 25J, a burn-out or melt-out process may be performed on the sacrificial layer sheet (110 and 120 of FIG. 25I), and a sintering process may be performed on the second stack structures 2000 and the conductive paste layer 300. Reference numerals 100a and 300a respectively denote a sintered active material sheet and a sintered conductive paste layer. Furthermore, reference numeral 2000a denotes a sintered second stack structure. The sintering process may be referred to as a "co-firing" process.

First, the second stack structures 2000 and the conductive paste layer 300 may be heated to an appropriate first temperature, for example, a temperature of about 500° C. or less, and retained at the first temperature for an appropriate time, thereby removing the binder material included therein. Then, the second stack structures 2000 and the conductive paste layer 300 may be heated to a second temperature, for example, a temperature of about 500 to 800° C., and retained at the second temperature for an appropriate time to burn out the sacrificial layer sheets (110 and 120 of FIG. 25I), thereby removing the same. Next, the second stack structures 2000 and the conductive paste layer 300 may be heated to a sintering temperature of an active material included in the active material sheet 100, for example, about 800 to 1200° C., and retained at the sintering temperature for a period of time, thereby forming the sintered active material sheet 100a and the sintered conductive paste layer 300a.

Depending upon the material of the sacrificial layer sheets (110 and 120 of FIG. 25I), the sacrificial layer sheets 110 and 120 may be burned out or melted out, and a temperature and a retention time therefor may vary. For example, when the sacrificial layer sheets 110 and 120 are formed of a carbon-based material, the sacrificial layer sheets 110 and 120 may be removed by a burn-out process, and when the sacrificial layer sheets 110 and 120 are formed of $Li_2CO_3$ or LiCl, the sacrificial layer sheets 110 and 120 may be removed by a melt-out process. In some cases, by omitting a retention process at a middle temperature, the sacrificial layer sheets 110 and 120 may be directly heated to a sintering temperature of the active material, and thus the burn-out (or, melt-out) process and the sintering process may be simultaneously performed. The substrate 200 of FIG. 25I may be removed in the sintering process of FIG. 25J with the sacrificial layer sheets 110 and 120.

Figure 25K:
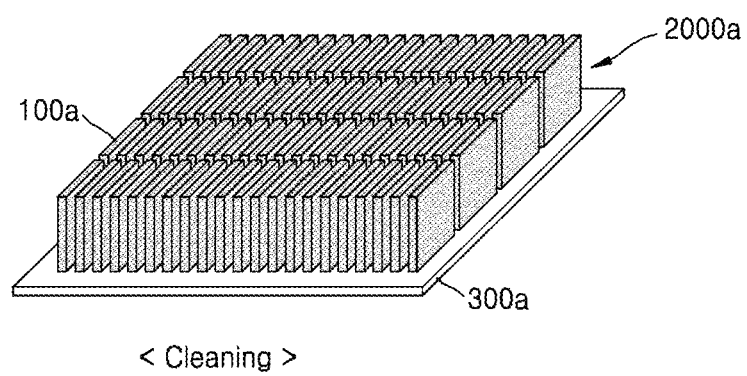

Referring to FIG. 25K, a cleaning process may be performed on the sintered second stack structure 2000a and the sintered conductive paste layer 300a. In this process, materials, that is, residue, remaining after the burn-out or melt-out process may be removed. The cleaning process may be performed by using, for example, water or deionized water.

In FIG. 25K, the sintered conductive paste layer 300a may correspond to the current collecting layer CL10 of FIG. 1, and the sintered active material sheets 100a may correspond to the active material plates AP10 of FIG. 1. The plurality of active material plates 100a may be spaced apart from one another in the widthwise and lengthwise directions. The structure of FIG. 25K may correspond to the 3D electrode structure described with reference to FIGS. 1 and 2.

The manufacturing method described with reference to FIGS. 25A to 25K may be changed in various ways. For example, after the sintering process is first performed on the cut second stack structures 2000 obtained by the process of FIG. 25H, the process of forming a current collecting layer (conductive layer) may be performed. Furthermore, according to the material of the sacrificial layer sheets 110 and 120 of FIG. 25I, instead of burning out or melting out the sacrificial layer sheets 110 and 120 in the sintering process of FIG. 25J, the sacrificial layer sheets 110 and 120 may be removed by other methods. For example, the sacrificial layer sheets 110 and 120 may be removed by a selective etching method, which is described with reference to FIGS. 26A to 26C.

Figure 26A:
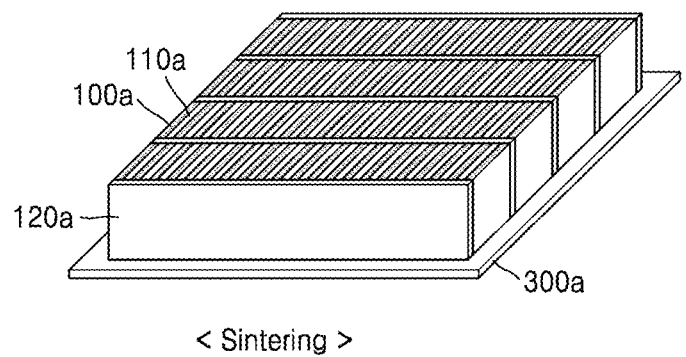
FIGS. 26A to 26C are perspective views illustrating a method of manufacturing a 3D electrode structure according to another embodiment.

Referring to FIG. 26A, after the sintering process, the sacrificial layer sheets 110a and 120a may not be removed, and may remain. The other structures may be the same as or similar to those of FIG. 25J.

Figure 26B:
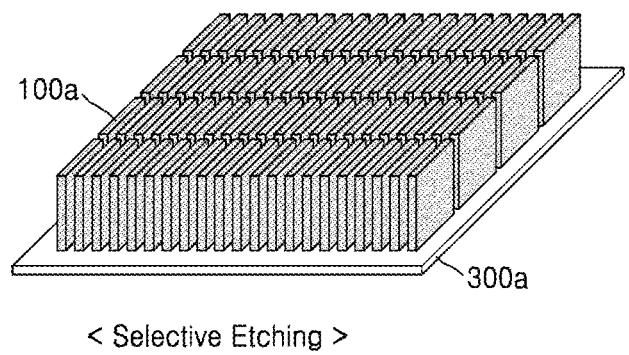

Referring to FIG. 26B, the sacrificial layer sheets (110a and 120a of FIG. 26A) may be removed by using the selective etching process. For example, when the sacrificial layer sheets 110a and 120a include a Li-containing oxide such as $Li_2CoSiO_4$, the sacrificial layer sheets 110a and 120a may be removed by using an etching solution such as hydrofluoric acid (HF) solution. The HF solution may be a solution obtained by adding HF to water to a concentration of about 0.5 vol % to 20 vol %. However, the types of the material and the etching solution of the sacrificial layer sheets 110a and 120a presented herein are exemplary, and may be changed in various ways.

Figure 26C:
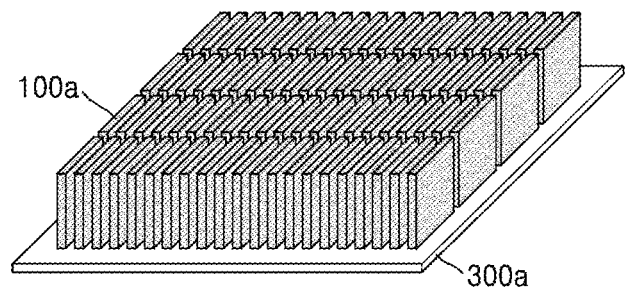

Referring to FIG. 26C, a cleaning process may be performed on the 3D structure where the sacrificial layer sheets 110a and 120a are removed. The cleaning process may be performed by using, for example, water or deionized water.

After the 3D electrode structure is manufactured as illustrated in FIG. 25K or FIG. 26C, the electrolyte layer, the second active material member, and the second current collecting layer are sequentially formed on the manufactured 3D electrode structure, as described with reference to FIG. 11, and thus a secondary battery may be manufactured. The manufactured secondary battery may have the structure as described in FIG. 12 and FIGS. 18 to 21, or various structures modified therefrom. In some cases, the second active material member and the second current collecting layer may be formed as a single integrated element. In other words, a part of the second active material member may be used as a current collector. In this case, a separate second current collecting layer may not be formed.

According to another embodiment, as described with reference to FIG. 15, the 3D electrode structure in which the inner current collecting layer Cp11 is included in the active material plates AP11 may be manufactured. For example, in the operation of FIG. 25D, instead of the active material sheet 100 of a single-layer structure, a "multilayer film" including an inner current collecting layer between two active material sheets may be used. Then, the subsequent processes of FIGS. 25E to 25K are performed, and the 3D electrode structure in which the inner current collecting layer is provided in each active material plate may be manufactured.

According to another embodiment, as described above with reference to FIG. 16, the 3D electrode structure in which the current collecting layer CL12 includes a conductor-active material composite may be manufactured. For example, in the operation of FIG. 25I, a composite material (mixed material) including a conductor and an active material may be used as the material of the conductive paste layer 300a. In an example, conductor-active material composite slurry or paste may be manufactured by appropriately mixing a conductive material, for example, a metal material, an active material, a dispersing agent, a binder, a plasticizer, and a solvent, and the conductive paste layer 300a is formed by using the conductor-active material composite slurry or paste and the subsequent processes may be performed. As a result, the 3D electrode structure in which the conductor-active material composite is applied to the current collecting layer may be manufactured.

The secondary battery including the 3D electrode structures according to the above-described various embodiments may be applied to various electronic apparatuses. The electronic apparatus may include a mobile device and a wearable device. The mobile device may include, for example, a mobile phone (smartphone), and the wearable device may include, for example, a smart watch or a smart band. However, the application field of the secondary battery is not limited to a mobile phone or a smart watch, and may be changed in various ways. Furthermore, the secondary battery may be applied to various other electronic apparatuses rather than the mobile device or wearable device, and may be applied to all fields in which existing secondary batteries are applied. Since the 3D electrode structure according to the above embodiments has a high energy density, superior rate capability, stability, and durability, an electronic apparatus having superior power source function may be implemented by using the above 3D electrode structure.

Although multiple embodiments are presented in detail herein, they do not limit the scope of the disclosure, but are to be interpreted as an example of a detailed embodiment. For example, one of ordinary skill in the art would understand that the 3D electrode structure and the structure of the secondary battery described with reference to FIGS. 1, 2, and 12, FIGS. 15 to 17, FIGS. 18 to 21, and FIG. 24 may be variously modified. In a detailed example, the formation direction of the active material plates AP10 with respect to the current collecting layer CL10 may be changed. The discontinuous region included in the active material plates AP10 may be provided with a certain gap according to the lengthwise direction of the active material plates AP10. The length of the active material plates AP10 may vary in the widthwise direction of the active material plates AP10. Furthermore, it may be seen that the manufacturing method of the 3D electrode structure described with reference to FIGS. 25A to 25K, FIGS. 26A to 26C, and FIG. 11, and the manufacturing method of the secondary battery adopting the same, may be changed in various ways. In addition, it may be seen that the application field of the 3D electrode structures according to the embodiments may be changed in various ways. Thus, the scope of the disclosure should be determined not by the above-described embodiments, but by the technical concept set forth in the claims.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A secondary battery comprising:
    a first electrode structure;
    a second electrode structure spaced apart from the first electrode structure; and
    an electrolyte layer disposed between the first electrode structure and the second electrode structure,
    wherein the first electrode structure comprises:
        a current collector layer; and
        a plurality of first active material plates electrically connected to the current collector layer, protruding from the current collector layer, and comprising a first active material,
        wherein each first active material plate of the plurality of first active material plates has a width and a length greater than the width, and the plurality of first active material plates are spaced apart from one another in a widthwise direction and in a lengthwise direction, and
    wherein the electrolyte layer extends into gaps between the plurality of first active material plates along the lengthwise direction.

2. The secondary battery of claim 1, wherein the plurality of first active material plates comprises a first plate and a second plate spaced apart from the first plate in the lengthwise direction,
    the first plate has a first end surface facing the second plate, and the second plate has a second end surface facing the first end surface, and
    the electrolyte layer covers at least a portion of each of the first end surface and the second end surface.

3. The secondary battery of claim 2, wherein the plurality of first active material plates comprises a third plate spaced apart from the first plate in the widthwise direction,
    the first plate has a first side surface facing the third plate, and the third plate has a second side surface facing the first side surface, and
    the electrolyte layer covers at least a portion of each of the first side surface and the second side surface.

4. The secondary battery of claim 1, wherein the second electrode structure comprises a second active material member comprising a second active material, and
    the second active material member extends between the first plurality of plates along the widthwise direction and between the first plurality of active material plates along the lengthwise direction.

5. The secondary battery of claim 4, wherein an empty space defined by outer surfaces of the second active material member is present between the plurality of first active material plates.

6. The secondary battery of claim 1, wherein the first electrode structure is a cathode, and
    the second electrode structure is an anode.

7. The secondary battery of claim 1, wherein the width of each plate of the plurality of first active material plates is about 5 micrometers or greater.

8. The secondary battery of claim 1, wherein a ratio of a height to the width of each plate of the first plurality of active material plates is about 4:1 or greater.

9. The secondary battery of claim 1, wherein each plate of the plurality of first active material plates has a length greater than a height thereof.

10. The secondary battery of claim 1, wherein a gap between the plurality of first active material plates in the widthwise direction has a distance which is 50% or greater of the width of each plate of the plurality of first active material plates.

11. The secondary battery of claim 1, wherein a gap between the plurality of first active material plates in the lengthwise direction has a distance which is 50% or greater of the width of each plate of the plurality of first active material plates.

12. The secondary battery of claim 1, wherein at least two plates of the plurality of first active material plates have lengths which are different from each other.

13. The secondary battery of claim 12, wherein the plurality of first active material plates comprises a first group of plates, and a second group of plates spaced apart from the first group of plates in the lengthwise direction,
wherein the second group of plates are closer to an end portion of the first electrode structure in the lengthwise direction than the first group of plates, and
a length of each of each plate in the second group of plates is shorter than a length of each plate in the first group of plates.

14. The secondary battery of claim 1, wherein each active material plate of the plurality of first active material plates comprises an inner current collector layer, and the inner current collector layer is electrically connected to the current collector layer.

15. The secondary battery of claim 1, wherein the current collector layer comprises a conductor-active material composite.

16. The secondary battery of claim 15, wherein a content of an active material in the conductor-active material composite is about 30 volume percent or less based on a total volume of the conductor-active material composite.

17. The secondary battery of claim 1, wherein the second electrode structure comprises a plurality of second active material plates, and
the plurality of first active material plates and the plurality of second active material plates are alternately arranged.

18. The secondary battery of claim 1, wherein the first electrode structure, the electrolyte layer, and the second electrode structure constitute a battery cell, and the secondary battery comprises a plurality of cells which are stacked.

19. The secondary battery of claim 1, wherein the secondary battery is a lithium secondary battery.

20. The secondary battery of claim 1, wherein the gaps between the plurality of first active material plates along the lengthwise direction are partially filled with the electrolyte layer and the second active material member.

21. A secondary battery comprising:
a first electrode structure;
a second electrode structure spaced apart from the first electrode structure; and
an electrolyte layer between the first electrode structure and the second electrode structure,
wherein the first electrode structure comprises:
a current collector layer; and
a plurality of active material plates electrically connected to the current collector layer, protruding from the current collector layer, and comprising an active material,
wherein each active material plate of the plurality of active material plates has a width and a length greater than the width, and the plurality of plates are spaced apart from one another in a widthwise direction and in a lengthwise direction, and
wherein the second electrode structure extends between the plurality of active material plates along the widthwise direction and between the plurality of active material plates along the lengthwise direction.

22. The secondary battery of claim 21, wherein the plurality of active material plates comprises a first plate and a second plate spaced apart from the first plate in the lengthwise direction,
the first plate has a first end surface facing the second plate, and the second plate has a second end surface facing the first end surface, and
the second electrode structure covers at least a portion of each of the first end surface and the second end surface.

23. The secondary battery of claim 21, wherein the electrolyte layer extends between the plurality of active material plates along the widthwise direction and between the plurality of active material plates along the lengthwise direction.

* * * * *